(12) United States Patent
Zane et al.

(10) Patent No.: US 7,433,863 B2
(45) Date of Patent: *Oct. 7, 2008

(54) SQL CODE GENERATION FOR HETEROGENEOUS ENVIRONMENT

(75) Inventors: Barry M. Zane, Wayland, MA (US); James P. Ballard, Northbridge, MA (US); Foster D. Hinshaw, Somerville, MA (US); Premanand Yerabothu, Southborough, MA (US)

(73) Assignee: Netezza Corporation, Framingham, MA (US)

( * ) Notice: Subject to any disclaimer, the term of this patent is extended or adjusted under 35 U.S.C. 154(b) by 550 days.

This patent is subject to a terminal disclaimer.

(21) Appl. No.: 10/887,247

(22) Filed: Jul. 7, 2004

(65) Prior Publication Data

US 2005/0028134 A1 Feb. 3, 2005

Related U.S. Application Data

(60) Provisional application No. 60/485,638, filed on Jul. 8, 2003, provisional application No. 60/485,321, filed on Jul. 7, 2003.

(51) Int. Cl.
*G06F 17/30* (2006.01)
(52) U.S. Cl. .................................. 707/2; 707/5; 707/101
(58) Field of Classification Search .................. 707/1–5, 707/100–101; 711/118, 122; 717/119, 140, 717/149, 151, 165; 345/557
See application file for complete search history.

(56) References Cited

U.S. PATENT DOCUMENTS

| 4,829,427 | A | 5/1989 | Green |
| 5,091,852 | A | 2/1992 | Tsuchida et al. |
| 5,301,317 | A | 4/1994 | Lohman et al. |
| 5,806,059 | A | 9/1998 | Tsuchida et al. |
| 5,875,334 | A * | 2/1999 | Chow et al. ................. 717/141 |
| 5,930,795 | A | 7/1999 | Chen et al. |
| 6,219,660 | B1 | 4/2001 | Haderle et al. |
| 6,353,819 | B1 | 3/2002 | Edwards et al. |
| 6,907,546 | B1 | 6/2005 | Haswell et al. |

(Continued)

OTHER PUBLICATIONS

Pittenger, R., "C++ Object Oriented Database Generator" [online], [retrieved on Jun. 21, 2004]. Retrieved from the Internet URL: http://www.codeproject.com/database/obgen.asp.

(Continued)

*Primary Examiner*—Diane Mizrahi
(74) *Attorney, Agent, or Firm*—Hamilton, Brook, Smith & Reynolds, P.C.

(57) ABSTRACT

This invention relates generally to a system for processing database queries, and more particularly to a method for generating high level language or machine code to implement query execution plans. in one preferred embodiment, the method begins by receiving a subject query, and then forming an execution plan corresponding to the subject query. The execution plan will typically have a sequence of component snippets or pieces and corresponding processes for implementing the pieces. For at least one piece in the plan, the process then (a) generates source code using different code generation techniques as a function of expected runtime processing machine types; and then (b) compiles the generated source code to form machine executable code for implementing the subject query. As a result, the query executed directly as machine executable code thereby avoiding runtime interpretation of the pieces in the execution plan.

20 Claims, 5 Drawing Sheets

U.S. PATENT DOCUMENTS

| | | | |
|---|---|---|---|
| 7,089,448 | B2 | 8/2006 | Hinshaw et al. |
| 7,203,678 | B1 * | 4/2007 | Petropoulos et al. ........... 707/4 |
| 2001/0052108 | A1 | 12/2001 | Bowman-Amuah |
| 2003/0233632 | A1 | 12/2003 | Aigen et al. |
| 2004/0148420 | A1 * | 7/2004 | Hinshaw et al. ............. 709/231 |
| 2004/0181537 | A1 * | 9/2004 | Chawla et al. ............. 707/100 |
| 2006/0129605 | A1 | 6/2006 | Doshi |

OTHER PUBLICATIONS

"SQLpp is a SQL Query Generation Framework for C++ and .NET." [online], [retrieved on Jun. 21, 2004]. Retrieved from the Internet http://sqlpp.sourceforge.net/.

Andreas, S., "SQL Where—The Easy Way," [online], [retrieved on Jun. 21, 2004]. Retrieved from the internet http://www.codeproject.com/database/cwhere.asp?print=true.

Graefe, G. and W.j. McKenna, "The Volcano Optimizer Generator: Extensibility and Efficient Search," *Proceedings of the International Conference on Data Engineering,, Comp. Soc. Press*, vol. Conf. 9, Apr. 19, 1993, pp. 209-218.

Gerbes, T. et al., Implementing Dynamic Code Assembly for Client-Based Query Processing, *Database Systems for Advanced Applications '95, Proceedings of the Fourth International Conference on Database Systems for Advanced Applications World Scientific*, Singapore, Apr. 10, 1995, pp. 264-272.

* cited by examiner

SQL CODE GENERATION FOR HETEROGENEOUS ENVIRONMENT

RELATED APPLICATION

This application claims the benefit of U.S. Provisional Application No. 60/485,321, filed Jul. 7, 2003 and 60/485,638, filed on Jul. 8, 2003 the entire teachings of which are incorporated herein by reference. This application is related to U.S. patent application Ser. No. 10/886,011, filed Jul. 7, 2004, U.S. patent application Ser. No. 10/145,571, filed May 13, 2002, and U.S. patent application Ser. No. 10/667,127, filed Sep. 18, 2003 which are hereby incorporated by reference in their entireties.

BACKGROUND OF THE INVENTION

When using a declarative query language like SQL, a database client enables generation of queries that say 'what to do' with a database, but not 'how to do it'. It is the task of a database management system (DBMS) to translate the client's declarative specification (query) into an operational procedure. When a client specifies a query like:

select lastName, firstName from emp where dept='software' the DBMS parses and analyzes the query to form a high-level execution plan. This plan might consists of several steps:

1. Scan the set of records in the "emp" table
2. Restrict the set to just those records whose "dept" column value is 'software'
3. Project the "lastName" and "firstName" columns from the resulting records
4. Return a set of <lastName, firstName> tuples This sequence of steps will satisfy the client's SQL query in principle, but it is not executable code by itself. Many details have been left unspecified. The task of turning a query execution plan into executable code is typically accomplished in the interaction between two DBMS components: a code generator and a runtime execution engine.

A code generator takes a high-level execution plan, fills in details, and produces code that the runtime engine can execute. In some DBMSs, the runtime engine is a powerful, high-level interpreter of execution plans. In these systems, the code generator might merely need to provide some annotations of the execution plan, such as field offsets or names. In other DBMSs, the code generator might produce executable machine code that is dynamically linked and called by the runtime engine. Many DBMSs opt for a middle ground, where the code generator produces instructions in an intermediate "p-code", which is interpreted by the runtime engine.

Systems where a code generator produces executable machine code for ad-hoc queries are very rare. One reason is that it is much easier to write and debug an interpreter. It is also true that DBMS source code is less "portable" to different computer platforms when it generates code targeted at a specific chip set. But a more compelling reason is that the performance advantages of executing compiled machine code in the runtime engine must be balanced against the time required to produce this code in the code generator. In environments where there are many small, short queries, the cost of producing executable code may be greater than the runtime benefit. In environments with I/O-bound queries (where the cost of evaluating the query is dominated by the time it takes to read records from disk), the advantage of saving a few CPU cycles by running machine code may be irrelevant, or too small to be worth the bother.

SUMMARY OF THE INVENTION

The present invention addresses the problems of the prior art and improves on the prior art systems for processing database queries. The present invention provides an optimized method for generating executable machine code in a heterogenous environment consisting of several different execution processor types.

A computer system (method and apparatus) for generating executable code in response to a received query in a database management system. Optimized methods for generating such code are in related U.S. patent application Ser. No. 10/886,011, entitled "Optimized SQL Code Generation" filed on Jul. 7, 2004 and herein incorporated by reference.

In one preferred embodiment, that process begins by receiving a subject query, and then forming an execution plan corresponding to the subject query. The execution plan will typically having a sequence of component snippets or pieces and corresponding processes for implementing the pieces. For at least one piece in the plan, the process then (a) generates source code using different code generation techniques as a function of expected runtime processing machine types; and then (b) compiles the generated source code to form machine executable code for implementing the subject query. As a result, the query executed directly as machine executable code thereby avoiding runtime interpretation of the pieces in the execution plan.

The identified processing machines can be of different types, and the process of compiling optimized code for the specified machine types can remain separate from the plan generation process.

In other embodiments, the code compiled for at least one piece of the plan is cached so that it remains available for use in processing a subsequent SQL query without rerunning the generating step. The compiled code may be stored and retrieved using hashing functions or other suitable techniques.

Furthermore, code generation may be pipelined. Here, an execution plan is still formed as a sequence of pieces and corresponding processes for implementing the pieces, and source code is still generated for the several identified pieces of the plan. However, code generation and/or compilation for a subsequent piece can be delayed until a prior piece is executing and/or even until the results of execution of the prior piece are available. This permits the generation of source code for a subsequent piece to overlap in time with execution of the prior piece, for execution efficiency, but perhaps more importantly, permits compilation of the subsequent piece be dependent upon execution results of code generated for the prior piece.

Because compiled code is generated as part of the query plan execution process, further advantages are realized. For example, query plan instructions can be carried out using machine—specific natively supported arithmetic. Thus, a high level query language may specify arithmetic operations at a query language precision level, but the code generation for the target runtime machine will generate only instructions that are carried out using native data types of the target processing machine types, or determined by statistics taken from data in the database.

Similarly, where the target runtime machines have different features, such as different numbers of general purpose registers (GPRs), the compiling step can track register usage differently for the different target processing machines.

The code generation process includes generated source code that has human readable code containing comments. This greatly expedites later analysis of the generated code for analysis or debugging purposes.

Finally, techniques are specified so that the generated code includes human readable source code having variable names that follow a predefined convention.

These and other features of the present invention will be further described later. Generally speaking, advantages of computer systems employing the present invention optimized DBMS are as follows.

Avoiding Unnecessary Computations and Checks

An executable code generator is useful in environments where there are frequent long or computationally complex queries. In such cases it is valuable to reduce computation overhead to a minimum, particularly so when it occurs in an "inner loop". Query execution engines that interpret plans or p-code typically pay a performance penalty for extra checking, conservative assumptions about arithmetic, pointer indirections, and suboptimal memory usage. Code generation can avoid these kinds of overhead.

Checks can be generated only when there's a possibility they may be necessary. When numeric fields have a suitable scale and precision, machine instructions that directly support that scale and precision can be used to advantage. Instead of referencing a field as an indirection from a base pointer plus a field offset, the code generator can place the address of the field directly in a register. Memory management overhead can be reduced by placing working variables on the program stack, and by avoiding intermediate materialization. Specific examples of these cases are considered below.

Avoiding Checks for Null Values

The code generation techniques used in the invention can eliminate unnecessary checking for null values. Databases typically allow record fields to have a "null" value—which means that no value for the field has been specified. Some systems implement the null value as a special data value; but it is more common to track null values in a special area, that is invisible to the user. One common technique is to use an extra invisible field in each record that contains a bit-vector. If the $n^{th}$ bit is set, that means that the $n^{th}$ field is null. Whatever mechanism is used to represent null values, query execution plans must frequently check for the presence of null values. However sometimes it's possible to know that a field cannot hold a null value. A SQL column definition may preclude the possibility of null values. Even if a column definitionally allows null values, database statistics may show that there are no instances of null values for that column at the time of the query. In such cases, the code generator avoids generating the code to test for a null value.

Using Natively-Supported Arithmetic

Another situation of interest involves the precision and scale of arithmetic expressions and aggregations. Say the SQL implementation supports 128-bit math for a numeric data type having maximum declared precision of 38 decimal digits, but in one embodiment there is native support only for 16 and 32-bit arithmetic. Sometimes the declared precision and scale of column definitions allows the code generator to "know" that it can safely use the natively supported arithmetic functions. Other times, the actual audited minimum and maximum values of columns imply that natively supported arithmetic can safely be used at the time the query is evaluated. In these situations CPU time can be save by avoiding overflow checking and by using natively supported instructions. Importantly, the code generator tracks the precision and scale of the result of a numeric expression, so that compound and intermediate expressions are assigned a precision and scale derived from the precisions and scales of their components.

By way of an example involving aggregation, consider a large table that is horizontally partitioned across a thousand nodes, with each node holding 100,000 rows. Assume that the table has a numeric column of scale zero, whose maximum value is 250; and that a query wishes to compute the sum of that column. The query execution plan calls for each of the thousand nodes to compute a local sum, and then to aggregate these results into a final global summation. On each of the thousand nodes, the maximum value for the local summation can be computed using 32-bit arithmetic (8 bits for holding each record value, and 17 bits for representing each row). But the global aggregation would require 35 bits in the worst case, and would therefore require 64-bit arithmetic.

By way of an example involving a scalar expression, consider a table having numeric column A of declared precision and scale (15,2), and numeric column B of declared precision and scale (10,1). Say we are selecting the expression A*B (i.e. the product of columns A and B). Considering only the declared shapes of the components of the calculation, the result would have a precision and scale of (25,3) and evaluation would require 128-bit arithmetic. But suppose the actual audited minimum and maximum values of columns A and B are such that those values would fit in precisions and scales as small as (5,2) and (3,1), respectively. The product of such values would have a precision and scale of (8,3), permitting evaluation in narrow native arithmetic operations.

The above technique for the evaluation of expressions and aggregations of the numeric data type can be simply extended to include operations on integer data types by recognizing that an integer is no more that scale 0 numeric.

Compiled Field References

Two of the most frequent tasks of the runtime engine are to retrieve or modify the value of a field in a record or tuple. Essentially this involves computing the address of the field as an offset from the start of the record or tuple. In the invention, this computation occurs once at compile time (for fixed-length fields or for the first varying field). In an interpretive runtime engine, the computation must typically be performed for every access. While the computation is very fast, when operating across millions of records, or joins whose Cartesian product is extremely large, this small overhead adds significantly to overall latency.

Avoiding Intermediate Materialization

Queries that contain a join of two or more tables logically form the cartesian product of the constituent records. Consider a simple query such as:

select emp.name, dept.name from emp, dept, where emp.dept_no=dept.id

The target response to the query is to return a two column result consisting of the name of an employee in the emp table and the name of the employee's department. One way to conceptualize this procedure is to imagine a stream of records from the "emp" table being combined with another stream of records coming from the "dept" table, with an output stream consisting of records with two columns for the emp.name and the dept.name.

In some systems, the output stream literally consists of new records, residing in memory, consisting of the emp.name value followed by the dept.name value. This is called a "materialization". Because allocating memory and copying data is expensive, it is desirable to delay materialization for as long as possible.

The invention represents the output stream of the join operator as two local variables that reference current record in each stream, and projects out the name fields of the records via structure offset expression, such as "currentRecordPtr->name". This approach avoids the memory allocation and copying overhead of materialization until data values must be returned.

Adapting Executable Code to Dynamic Condition

When a query execution plan is divided into a number of pieces, it's possible that the result of executing an earlier piece of the plan can impact the code generation choices for subsequent pieces of the plan. As previously discussed, it could be that the range of values returned by one piece is such that 32-bit arithmetic can be used in a subsequent piece. Or it could be that the number of results returned by a piece of the plan is small enough that a subsequent piece can use an in-memory sort, rather than a disk-based sort. The ability to adapt generated code to the dynamic intermediate results of a query opens important avenues for performance enhancement.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
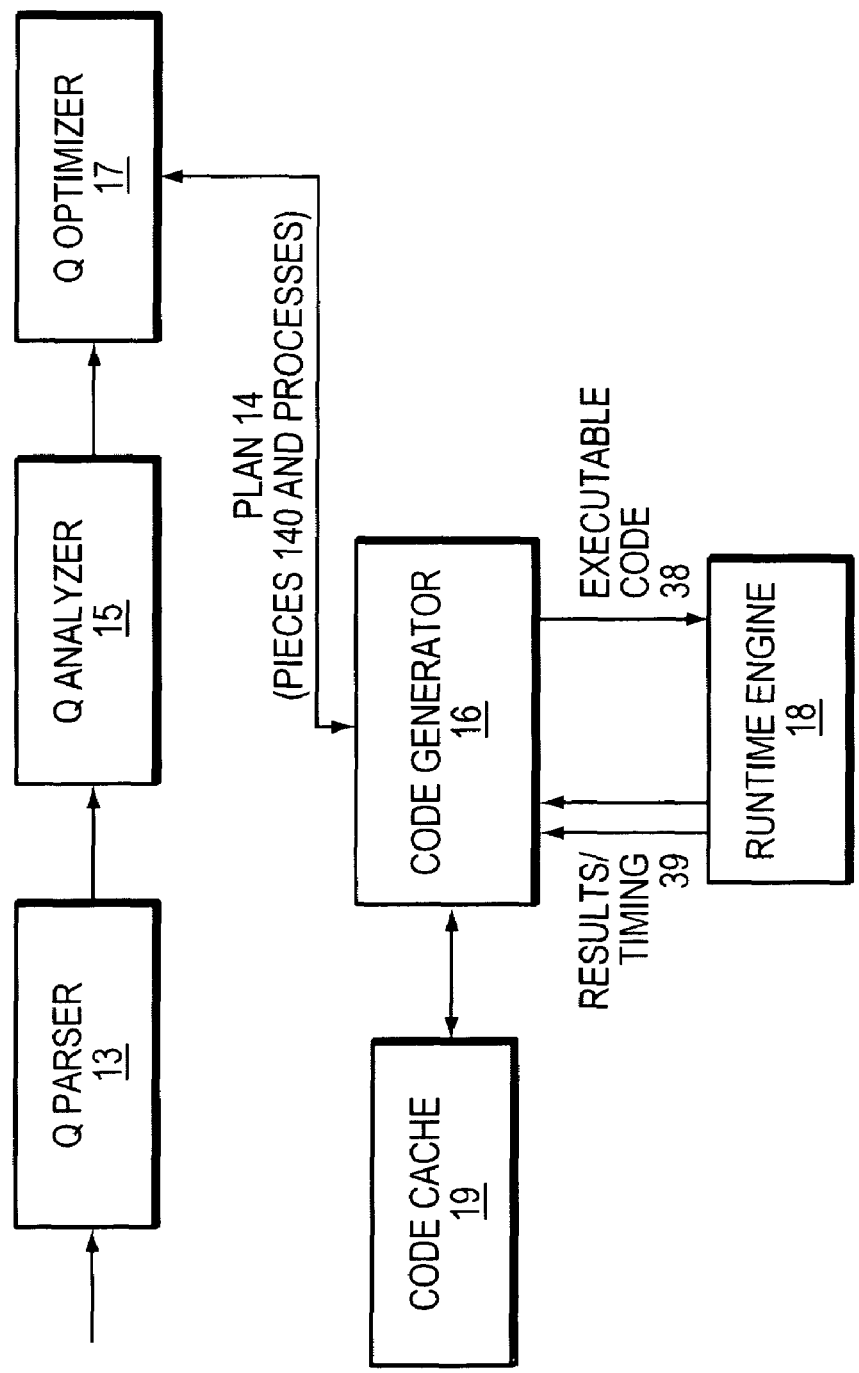
FIG. 1 is a block diagram of a DBMS implementing the present invention.

Illustrated in FIG. 1 is a database management system (DBMS) implementing the principles of the present invention. An SQL query 12 is input (e.g., from a database client) to the DBMS 10. In response, the DBMS 10 initially parses and analyzes the input SQL query 12 and generates a respective high level execution plan 14 having a sequence of pieces and corresponding processes. This is accomplished by a set of front-end components described below. A code generator 16 generates source code in a high level language for each piece (process) of the generated execution plan 14. The code generator 16 also compiles the source code for execution in a target environment and generates linkage information. The resulting executable machine code 38 is executed or run in a runtime execution engine 18 to perform a search on and retrieve requested data from the database corresponding to the SQL query 12.

The front-end components of DBMS 10 include a query parser 13, a query analyzer 15 and a query optimizer component 17. The query parser component 13 takes a native SQL query 12 and produces a parse tree structure using known techniques. The query analyzer component 15 takes the parse tree and produces an initial query execution plan. In turn, the query optimizer component 17 examines the initial query execution plan in conjunction with various runtime statistics and alters the plan to reduce its estimated compilation and execution costs. The result is an optimized high level execution plan 14 formed of a sequence of "pieces" which are targeted at different execution locales.

For example, in a distributed database environment, the plan may be subdivided into several pieces, where each piece may be distributed to and executed upon a different computational platform.

Heterogeneous Execution Environment

Figure 5:
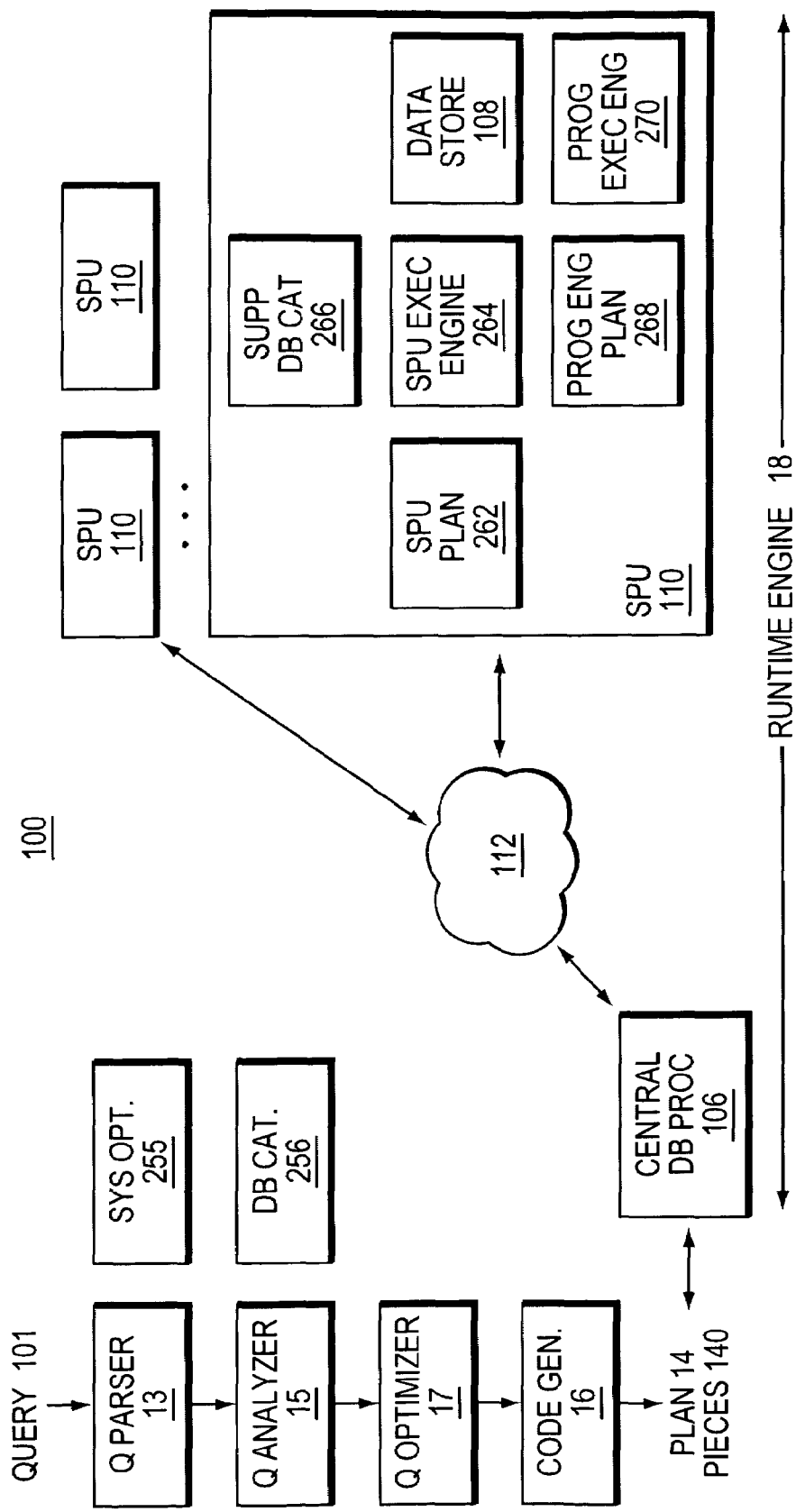
FIG. 5 is a more detailed diagram of the preferred heterogeneous execution environment.

FIG. 5 is an illustration of the logical components of one possible heterogeneous runtime engine 18 environment for a database appliance 100 configured according to the principles of the present invention. Pieces (or also called "snippets") 140 of the plan 14 may be fed to a central operation processor 106 which is connected to multiple Snippet Processing Units (SPUs) 110 through a data communications network 112. There can be multiple central database operation processors 106 and data communication networks 112 in a database appliance 100. In one preferred embodiment the parser 13, the analyzer 15, and the optimizer 17, as well as code generator 16 may also all run on the central operation processor 106; however it should be understood that these processes may run on and be distributed to different machines.

The parser 13 parses and the analyzer 15 checks the syntax of the database query 101. If the syntax is correct a query tree is produced, otherwise an error is generated. The query optimizer 17 then takes the query tree as input and generates an execution plan 14 using metadata from a primary database catalog 256. The optimizer 17 monitors data storage and execution plan 14 history in order to update the primary database catalog 256. Pieces 140 of the execution plan 14 are distributed and executed on various execution engines (e.g., central database operation processor execution engine 106, SPU execution engine 264 and programmable execution engine 270) within database appliance 100. The results of executing the snippets are aggregated on a central database operation processor execution engine (e.g., central database operation processor execution engine 106) and made available for further processing (e.g., printing).

Query optimizer 17 creates an optimal execution plan by combining possible ways of scanning and joining tables that appear in the database query 101 to achieve the desired result. The execution plan comprises basic database processing steps including: scan data, project, restrict, sort, hash, group, join, distribute, return, broadcast, etc. Each step can be comprised of multiple substeps. Each step is associated with a locale (i.e., an execution engine). The query optimizer 17 then chooses the optimal execution plan based on the processing capabilities, performance characteristics and current workloads of various components and the locality of the data records within the database appliance 100. Query optimizer 17 can alter the query tree both in form (adding, deleting, rearranging) database operations and in content (modifying) database operations, in addition to assigning operations to various execution engines. Query optimizer 17 calculates the optimal query plan 14 based on the lowest cost by considering possible steps, possible locales and data table access variants for each step of the execution plan.

The pieces 140 of the plan 14 generated by the query optimizer are then fed to the code generator 16. The code generator 16 then generates machine executable code for the various engines in the appliance, including at least the central operation processor 106, the SPUs 264 and programmable execution engines 270.

The query optimizer 17 uses several data structures in generating the pieces of the plan 14. For example, a primary database catalog 256 stores the performance characteristics of the various components and the location of the data records within the database appliance 100. Performance characteristics include, for example, availability of specific database operations on the execution engine, execution engine processor speed, execution engine processor cache configuration, data disk speed, data disk controller speed, data disk controller interface bandwidth, memory availability, memory speed, network interface controller speed and network interface bandwidth. Location information includes, for example, database table definitions, storage methods and database record count statistics. Using these characteristics and locality information from the catalog 256, query optimizer 17 can analyze the costs associated with various execution plans in order to choose the optimal plan. The optimal execution plan is generally considered to be the execution plan that will take the least elapsed time to complete. Other definitions of optimal (e.g., minimize I/O seeks or fabric traffic) are possible and the query optimizer 17 can be configured to create execution plans based on alternative definitions of optimal.

As mentioned previously, the execution plan 14 is comprised of various pieces (snippets) 140. Pieces 140 represent one or more database operations (e.g., scan, restrict, project, join, etc.) and an execution locale designation (e.g., central database operation processor 106, SPU 264, etc.). The pieces 140 are distributed to the various execution engines for processing and the results are aggregated at a designated central database operation processor execution engine. The ability to distribute the pieces/snippets 140 to different execution engines provides for parallel processing of database query 101. Parallel processing reduces the elapsed time to process the database query 101.

A system optimizer 255 monitors data storage usage and requirements. As execution plans 14 are executed statistics are gathered and maintained in primary database catalog 256. System optimizer 255 can thus maintain various usage statistics in order that query optimizer 17 can adjust execution plans 14 for optimal execution. System optimizer 255 is also used to detect reallocation thresholds and participates in planning for reallocation of data when certain predefined thresholds are met.

System components can also dynamically reconfigure the execution plan created by the system optimizer and redirect operations to other components as needed. For example, if a particular SPU 110 cannot perform an assigned operation for any reason (such as running out of memory), the SPU can change the assigned locality (e.g., to the central database operation processor) of that operation and any dependent subsequent operations in the execution plan. Similarly, a central database operation processor can direct operations to SPUs.

Central database operation processor execution engine 106 provides processing for database operations including the aggregation of data from other database operations. Central database operation processor 106 is connected to the SPU 110 through data communication network 112.

SPU 110 receives an SPU execution plan 262 containing database operations to be performed on data records stored on data storage units 108. SPU execution engine 264 executes the database operations and/or distributes them to a programmable execution engine 270. SPU execution engine 264 can access a local supplemental database catalog 266 as needed to determine optimal further distribution, in the same fashion the query optimizer 17 accesses primary database catalog 256. The resulting programmable engine execution plan 268 is then executed on programmable execution engine 270.

In one particular embodiment, the programmable execution engine 270 is a field programmable gate array (FPGA) configured specifically to perform certain database operations. Using input parameters, the FPGA can be reconfigured to perform various database operations selected from a set of preprogrammed operations. In another embodiment, programmable execution engine 270 is an application specific integrated circuit (ASIC) specifically configured to perform various database operations. Both the FPGA and ASIC implementations allow for increased speed in the execution of database operations as actual database instructions can be implemented in hardware/firmware. In other embodiments, various combinations of general purpose CPU, FGPA and ASIC, as well as other processing devices, can be used to implement the SPU execution engine 264 and programmable execution engine 270 without departing from the scope of the present invention.

The various execution engines within database appliance 100 provide for distributing database functionality in a flexible manner. Each execution engine can execute many different database operations. The configuration of the database engines is maintained in the various database catalogs, thereby allowing the query optimizer 17 to adjust the generation of execution plans 14 as the configuration of the execution engines changes. This flexibility allows for the dynamic reconfiguration of database records and database operations to suit specific performance needs without affecting the underlying operation of query optimizer 17. In this way database operations are executed by the most appropriate execution engine. For example, for a given query, record scanning may be done on SPU execution engine 264, restriction operations may be done on programmable execution engine 270 and join operations may be done on central database operation processor execution engine 106. However, with a change in operating conditions, the restrict operations may be moved to the SPU execution engine, for example.

The present invention also provides for overlapping functionality of database operations, as the various execution engines (central database operation processor execution engine 106, SPU execution engine 264, programmable execution engine 270) provide a subset of database operations. Because database appliance 100 provides for flexible distribution of database operation execution, multiple execution engines can provide overlapping functionality that is invoked based on external factors (e.g., data record layout, number of data records, performance characteristics of the execution engines, etc.).

More details of the preferred database system execution environment 100 can be found in a co-pending U.S. patent application Ser. No 10/145,571, filed May 13, 2002 entitled "Optimized Database Appliance", which is hereby incorporated by reference.

An Overview of the Code Generator 16

Figure 2:
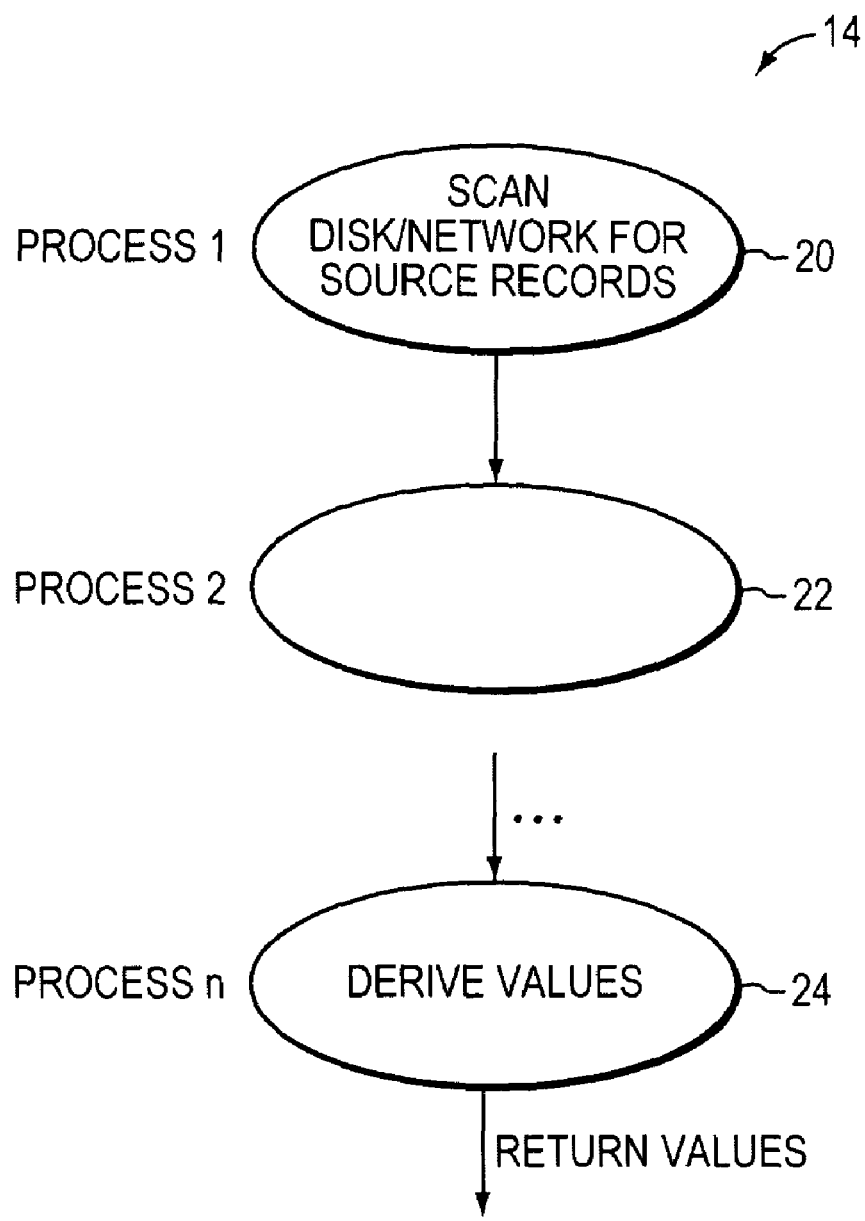
FIG. 2 is a schematic view of a sequence of processes of a high level query plan generated by a query optimizer component of the system of FIG. 1.

The high-level plan 14 and its various pieces 140 consist of a sequence of one or more "processes", where each process describes a particular kind of processing (set of steps) to be performed. FIG. 2 is illustrative. Records are processed by each process in sequence, and the results, if any, are passed on to the next process in the sequence.

In particular, the first process 20 of a query plan 14 involves a scan of a disk or a network or a memory cache for source records. The last process 24 of a query plan involves returning values derived from those source records. At the intermediate processes 22, there are a large number of different computational possibilities.

Figure 3:
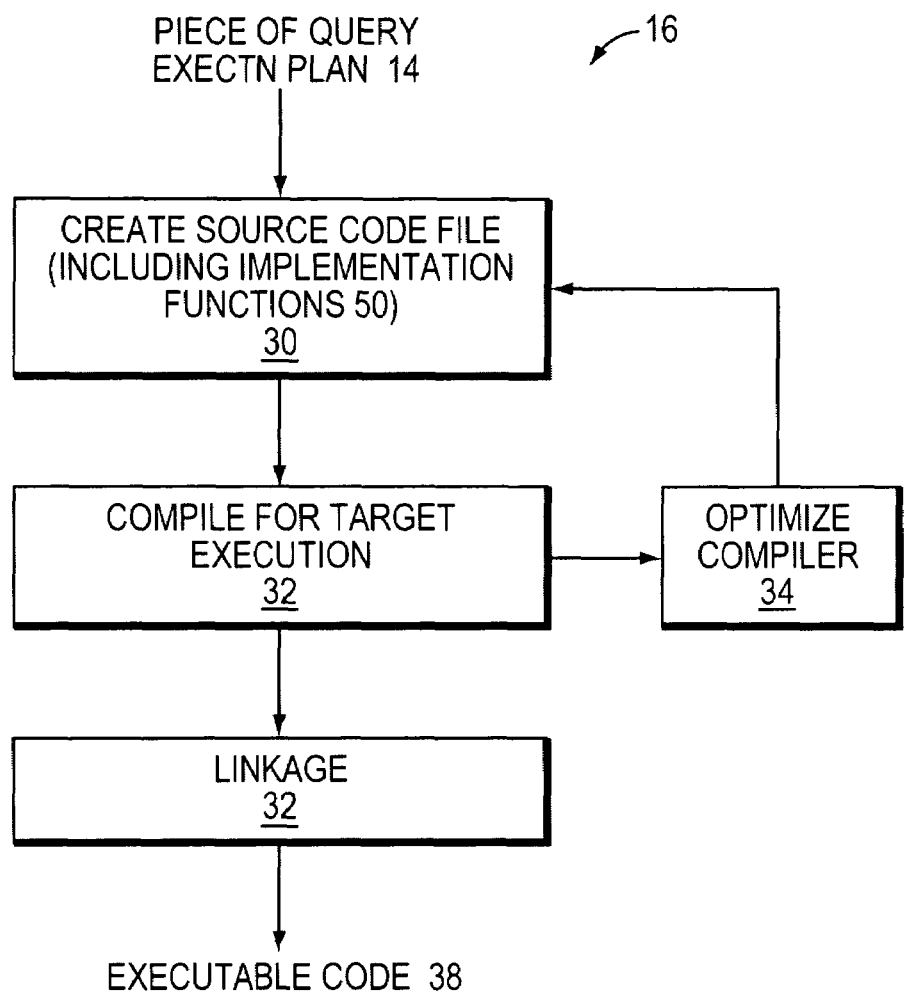
FIG. 3 is a block diagram of the code generator component of the system of FIG. 1.

Returning to FIG. 1 and with reference to FIG. 3, code generation by code generator 16 occurs as each piece of a query plan 14 becomes ready to execute. As illustrated at 30 in FIG. 3, a source code file is created for a subject piece of the plan 14, and code that implements the processes 20, 22, 24 in that piece is written in a high-level language and stored in the source file. In one embodiment, code is written in the C++ language, but other compilable languages could be used as well. Producing assembler code would also be possible, but would limit execution to particular hardware platforms. Going to a high level language enables the present invention optimizations such as register tracking and other optimizations supplied by the compiler.

In a preferred embodiment, different code generation techniques are employed at 30 for different pieces of the plan depending on data size (and other characteristics), current conditions and/or workload. For example, code generator 30 selects code generation techniques based on intermediate results of earlier pieces of plan 14. As such, source code generation is adapted to dynamic conditions. This and other examples will be made clear below.

After the source code is written to the source code file at 30 (FIG. 3), the source code file is compiled 32 for the target execution environment. The degree or level of compiler optimization 34 enabled can be a function of the expected query execution time. Queries with minimal expected execution time can use a lower level of compiler optimization. On the other hand, queries with a relatively long (Typically multiple seconds) expected execution time receive a higher level of compiler optimization at 34. If the target execution environment 18 uses a different computer architecture than does the compilation environment, then a cross compiler is used to perform the compilation 32.

Finally linkage information 36 is generated so that the compiled code can be dynamically linked into a running executable 38.

The code generator 16 may preferably make use of caching techniques to avoid re-compilation of pieces 140. In particular, the code cache 19 (FIG. 1) if present, can be used to store and thus re-use compiled code pieces 140. The compiled code pieces may be identified via one or more hashing functions and/or stored and retrieved in other suitable ways. Thus, in the preferred embodiment, a given plan 14 will always be parsed, analyzed and broken into its component pieces 140—however, compilation of pieces into machine coded is avoided whenever possible and only performed as necessary.

Code generator 16 may also make use of information returned from processes executing in the runtime engine 18, such as information on the time of execution and/or completion of code pieces. This permits the code generator 16 to generate and/or compile pieces 140 of the plan 14 "just in time", as they are needed. By way of illustration, consider a plan that has five (5) pieces 140. Rather than generate the machine code for all five pieces and then proceed to execute them, code can be generated in a pipeline fashion, and only as needed. For example, code to execute several identified pieces of the plan, such as the first, second and third piece, may be compiled and delivered to the runtime engine 18 for execution. However, compilation of the code for a subsequent piece, such as a fourth piece, is delayed until the third piece is actually executing.

Pipelined code generation has several benefits. Not only does it permit the runtime engine 18 to start execution earlier than it would otherwise, it further allows of optimization of the running of the plan 14. In particular, if generation of code for a subsequent piece is delayed until results of the execution of a prior piece are available, the program logic of the piece may be defined in such a way as to specify generation of different code depending upon those prior results. Thus, the subsequent (e.g. fourth) code piece may be differently generated depending upon operation results of the prior piece and any conditions present at the time of compilation. These conditions may include, for example, statistics taken on the characteristics of the indicated records in the database. So if the data to be processed is only of a certain low precision (such as 8 bits), even when the high level SQL instructions specify a higher precision (such as 64 bits, the generated machine code will only use the necessary 8 bit precision).

Indeed, the logic of the plan may be such that the subsequent piece need not be generated and/or compiled at all, depending upon the results of a prior piece.

It should also be understood that the code generator 16 uses locale configuration information in the catalog to generate different code depending upon specific capabilities of the target runtime engine 18. Consider an example where the runtime engine 18 includes two types SPUs 110 (FIG. 5). A first SPU 110 may have say thirty-two (32) general purpose registers (GPRs) which are accessible for use in its the machine code. A second SPU 110 might be an older model of the same processor type but may have only eight (8) GPRs. The code generated for a given piece 140 to be run on the first SPU will thus optimally exploit the existence of the additional 24 registers and make use of them as much as possible, Thus the code compiled for the first SPU will be different from the code compiled for the second SPU, even though the plan pieces 140 for each start out the same.

The Structure of a Source Code File 30

In the preferred embodiment, there is regularity to the structure of each source code file at 30 (FIG. 3). First, there is a comment that describes the piece of the plan that is implemented in the file. Next come preprocessor definitions and #include directives. Third are definitions describing the structure of tuples flowing into and out of each node of the piece of the plan 14. Fourth are static function declarations for any "helper" functions. Fifth are one or more functions implementing the processes of the piece of the plan 14. In general, there is an implementation function for each process; but the implementations of some processes are combined into a single function. Last are the implementations of "helper" functions.

The Structure of an Implementation Function 50

There is regularity as well to the functions 50 that implement the processes of the plan 14. The signature of such functions 50 is always the same. They 50 take as inputs a plan object, a pointer to the start of an incoming record stream, a pointer to the end of the record stream buffer, and a Boolean indicator of whether the function 50 is being called for the last time. The functions 50 return no values, but they typically modify the plan object passed in, so as to reference the values produced by the implementation of the plan process 20, 22, 24.

The body of the implementation functions 50 consists of four segments. First is a header section containing variable declarations and initializations. Next comes a loop and whatever declarations, initializations and resource allocations are required to initialize the loop. The purpose of the loop is to iterate over the records in the input stream. Third comes the body of the loop. This is where individual records are processed according to the dictates of the particular process 20, 22, 24. Finally, a footer section is generated to perform post-processing, release any resources and update the plan 14 to return results or connect to the next process/implementation-function 50 in the piece of the plan 14.

In one embodiment, multiple plan processes 20, 22, 24 can share the same loop, which avoids materializing intermediate results sets in a plan 14. Most typically, the loop is associated with the ScanNode. All processes 20, 22, 24 that follow the ScanNode have their body in the same loop until a materializing process occurs. In this embodiment, loops occur only for materializing processes.

The Approach Used for Code Generation

Code generation is driven by the processes of a piece of a plan 14. For every type of plan process, there are generation functions that emit portions of the process implementation functions 50 described above. Generating a process 20, 22, 24 implementation function 50 is accomplished by calling four functions in sequence: (1) to generate the signature of the function and to emit stack-based variable declarations, (2) to generate the for loop, (3) to generate the body of the for loop and (4) to generate footer code that comes after the for loop. These four functions may be implemented differently for different types of plan processes—so that the generated code performs the function described by the process. In essence, the code generation occurs in an object-oriented fashion, dispatching its implementation on the type of the process that is generating code.

Next described are the methods or procedures employed in code generation 16 of FIG. 3.

The Method Used to Create Executable Code 38 for a Plan 14

The first time the procedure is called, it reads variables which determine the target compiler to use, i.e., from the environment or from a configuration file. Next, it creates file names to hold the generated source code at 30. The names consist of the identifier of the plan, an indication of target locale of execution (e.g., is the piece to be executed on the central processor 106 or the SPU 110), and the identifier of the piece of the plan being implemented. In the third step, the procedure creates and initializes a CCodeGen structure. Next it performs (via optimizer 34) a quick check to see if the desired code has already been recently generated and compiled. If not, it calls the CCodeGen::genSrc function to generate the source code 30 for the subject piece of the plan 14. Then it calls a routine to compile 32 the source code, after which it generates linkage information 36.

The Method Used at 32 to Compile Generated Source Code

The first time the procedure is called, it reads variables from the environment or from a configuration file, which determine the target compilation flags to use as well as the -I include directives. Next, it logs the compilation attempt, and runs the compiler in a child process. Signals for abnormal termination of the compilation are caught and handled.

Utility Functions Used at 30 to Write Generated Code to the Source File or Buffer The following functions are used to output various programming constructs in the high-level programming language. Most of these add appropriate indentation and syntax specific to given programming constructs.

- Put (file, indentation level, format, . . . )—writes an indented line to the file
- PutLine—indents formatted text, writes to buffer, adds newline
- PutComt—indents, adds "//" comment to buffer
- PutStmt—indents, adds ";" at end, adds to buffer
- PutBlok—increments indentation level, adds "{" at end, adds to buffer
- PutCBlk—same as above, but adds a comment to the block: "{//"
- PutQBlk—used for aligning "if" and "else" statements
- PutBlank—emit a blank line
- PutLabl—emit a label: used for a possible goto statement
- EndBlok—decrements indentation level, PutLine("}");
- EmitStruct—emits a "struct" declaration While one embodiment uses C++ as the source code language, programming constructs like comments, statements, labels, blocks, structures and if-else statements are common to most procedural languages. The same utility functions ideas can be used with other choices of a high-level language used for code generation.

The Method Used at 30, 32 to Generate Tuple Structure Declarations

The CGenCode::genStreamNodes procedure takes the first and last processes 20, 24 as input, and produces structure declarations for tuples in the associated output streams. One of the performance advantages of the invention is that referencing fields via structure member references is compiled into a faster form than can be achieved by reference fields through interpreted offsets.

For example, if the subject query includes a join operation, code generator 30 represents the output stream of the join operation as local variables that reference current records in each input stream. Then at compilation 32, named fields of the records are projected. Consequently intermediate materialization and auxiliary structures (such as a set of pointers) are minimized.

An example would be a simple join query that joins two tables on a character-string column and sums the integer field values of the records of one of the tables that survives the join restriction—"select sum(salary) from emp, division where emp.deptname=division.deptnames". The example code is generated code to support this query—the line that demonstrates the usage of a non-materialized field is "Aggr8->f0+=Scan0->f0". Code lines not germane to the concept have been deleted and replaced with ". . . ".

```
DCC_PACKED struct TScan0 { // the table to be scanned
    TRecordNum rowNum;
    TXid txCreated;
    TXid txDeleted;
    uint16 size;
    uint8 nulls[1];
    uint8 pad1[1];
int f0;
char f1[12];
char f2[12];
} GNUC_PACKED ;
DCC_PACKED struct TTemp5 { // the previously scanned inner table,
cached in memory
    uint16 size;
    uint8 nulls[1];
    uint8 pad1[1];
char f0[12];
} GNUC_PACKED ;
DCC_PACKED struct TAggr8 {
    uint16 size;
    uint8 nulls[1];
    uint8 pad1[1];
CNumeric128 f0;
} GNUC_PACKED ;
...
    for ( Scan0 = (TScan0 *)bufStarts; Scan0 < (TScan0 *)bufEnds;
Scan0++, curRowAddr++ ) {
...
    hash4 = NzHashCharBuf((uint8*)Scan0->f2,sizeof(Scan0->f2),0);
    pTst5 = SELECT_HASH_LIST(tTemp5,hash4);
    while ( TRUE ) {
loop_5:
    // walk hash collision list, comparing all values
    for ( ; pTst5; pTst5 = pTst5->next ) {
        Temp5 = (TTemp5*)pTst5->recP;
```

-continued

```
    if ( memcmp(Scan0->f2,Temp5->f0,sizeof(Scan0->f2)) == 0) )
    { // got match?
        pTst5 = pTst5->next; // update pTst5 here because we don't hit
        loop ender
        goto joinln5; // allow processing of this record-pair by
        subsequent steps
    }
}
// move onto next stream row
    goto endLoop0__0;
joinln5:
    // Note that the aggregation uses the value directly
    from the scan record
    // rather than relying on an intermediate materialization or pointer set.
    Aggr8->f0 += Scan0->f0;
}
endLoop0__0:;
    }
}
```

To accomplish other minimization of auxiliary structures in the preferred embodiment, the procedure 30 starts by allocating a TStreamInfo structure for each plan process. Then, if the process' target locale is the host processor and if the process is not a scan, the procedure generates a structure definition for the record as read off the network fabric. Next, it loops over the processes in the CGenCode::m_nodeArray, and switches on their type. For most process types, it emits a structure definition whose name consists of the type of the process followed by the number/position of the process in the m_nodeArray. For example if the first process was a ScanNode, the name of the structure describing the record being scanned would be TScan0; and if the $4^{th}$ process was a SortNode, the name of the structure describing the output of the SortNode would be TSort3.

The procedure to emit a record structure definition is called CGenCode::emitStruct. It takes a description of the shape of the processes output, along with the type of the process, its position, the plan containing the process and a Boolean value to indicate whether the process' input stream comes from the disk or from the network fabric. The procedure does two things. It writes a structure definition to the source code file (via the CGenCode buffer) and it creates a TStreamInfo structure as an internal representation. The structure definitions include the relevant columns, and also some fields invisible to the query for tracking nulls (if necessary) and the size of the record (for processing variable length records).

In addition, the structures for different types of plan processes may specify additional fields. The records scanned from disk as the output of a ScanNode may contain additional information such as a rowNumber and one or two transaction identifiers. The records resulting from a ReturnNode have an indicator of whether byte-swapping is required.

The processing for a RestrictNode involves creating a p-code representation of the restriction expression. Similarly, the processing for a ProjectNode also involves creating a p-code representation of all project expressions. Furthermore, the shape of the input and output of the ProjectNode is analyzed and remembered.

The Method Used at 30 to Generate Source Code

Figure 4:
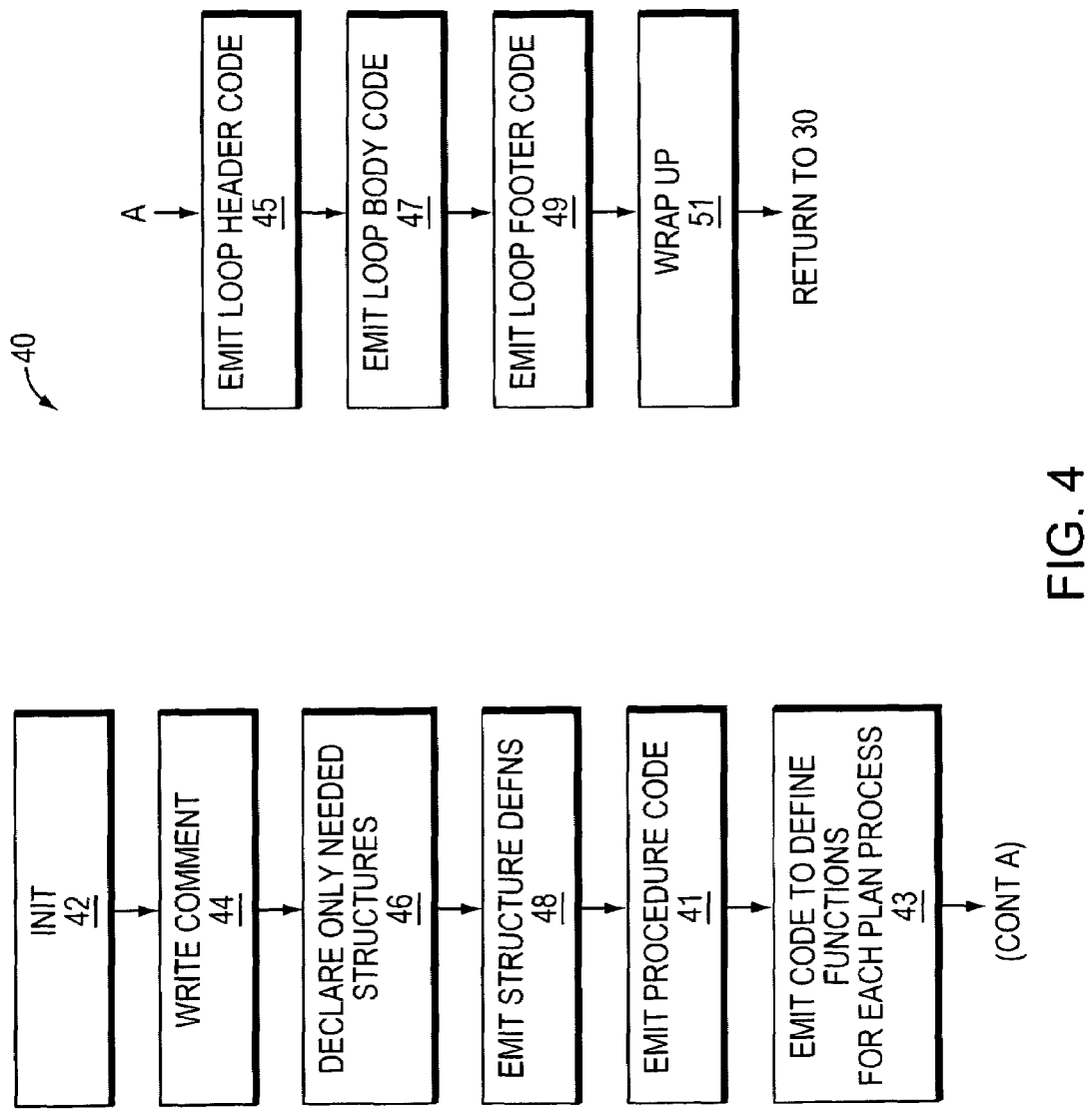
FIG. 4 is a flow diagram of the method used by the code generator of FIG. 3 to generate source code in a preferred embodiment.

In the preferred embodiment, source code is generated by the CGenCode:: genSrc procedure 40 illustrated in FIG. 4. The CGenCode::genSrc procedure 40 takes four arguments: the first process 20 of a piece of a plan 14, the last process 24 of the piece of the plan 14, the name of a source code file and a query execution plan 14. The procedure 40 does not return a value, but it writes source code to procedurally implement the processes passed in as inputs, and it modifies the plan object.

Initialization 42

In one embodiment, the first time the procedure 40 is called, it reads control variables from the environment or a configuration file and saves these in static variables. These variables are a convenience, and not strictly necessary for operation of the invention.

Next, it creates a memory allocation pool, initializes the source code indentation level to a non-indented value and initializes a state variable to indicate that it is not processing the last request. Then it opens the named source code file for writing, and sets user permissions on the file to limit access as desired. In one embodiment, access is limited to the user or the user's group, but not to the general public.

Emit Comment 44 Describing the Purpose of the Source Code File

The first thing written to the source code file is a multi-line comment that describes the current piece of the execution plan 14. The plan parameter has a function that dumps the current piece of the plan.

Emit Pre-Compiler Directives

After the initial comment, the next step 46 is to write out precompiler directives, which may include header files, define constants and macros, or do this conditionally depending on the state of certain configuration parameters.

Some of this is driven by the types of the processes in the piece of the plan. In order to more easily access the processes of the plan, the next step is to build an array of process pointers in the sequence they appear in the plan. The procedure GenCode::buildNodeArray takes the first and last processes 20,24 as inputs, allocates memory for pointers to the first through the last process 20, 22, 24, initializes the array and stores it in the CGenCode m_nodeArray data field.

Next the procedure 40 loops over the processes in this new array, and emits a precompiler definition of the form "#define NEED_<NodeType>1" for each process type. For example, if the first process was of type TScanNode, then the precompiler directive would be "#define NEED_ScanNode 1"; and similarly for other types of processes. These definitions are used to pull in pieces of a subsequently included file.

Next the procedure 40 emits an include directive to pull in a file containing structure definitions of process 20 types. Only those structures defined as NEEDED above are declared at 46, in order to save compilation time. Likewise only relevant structure members are included in the generated source code.

Next the procedure 40 emits a definition of a CTable structure, and finally it emits an include directive to bring in a number of useful macro definitions. Finally, the procedure switches the current buffer from the headerBuffer to the codeBuffer.

For example, in a preferred embodiment, the invention generates C++ code tailored to perform the function of a piece of the query's execution plan. This generated source code needs to access information in data structures that are also used by other portions of the generated source code. Some of these structures are very large. For example, one important structure is the CTable object declaration, which contains a great deal of information about a user table.

Generated code accesses only a handful of the many members of the CTable object. In order to minimize compile time for generated code, the invention avoids doing an # include of the CTable declaration header in the generated code. Instead, it inserts in-line into the generated code a local declaration of the CTable object defining only those CTable members that will be used by the generated code. This technique also speeds generated code compile time by avoiding pulling in additional headers that are # included by the CTable header itself.

These seemingly small reductions in the amount of code processed by the compiler in the course of compiling the generated code may seem like splitting hairs—but to the user of the invention, the total query time includes the time spent compiling the generated code (assuming it is not in the cache), and that compilation time can be a significant fraction of the total query execution time.

The invention code that creates the generated code's in-line definition of the CTable object is, itself, C++ code. It thus has access to the complete declaration of the CTable object and can programmatically emit the in-line CTable structure deriving it from the complete declaration of the structure.

For example, say that the generated source code needed only the 4th, and 7th members of a 10-member CTable structure. And say, for the purpose of this example, the CTable structure were as simple as:

Struct CTable

```
{
    int member1;
    int member2;
    int member3;
    int member4;
    int member5;
    int member6;
    int member7;
    int member8;
    int member9;
    int member10;
}
```

The inline CTable structure in the generated code would then be:

Struct CTable

```
{
    char pad1[12];
    int member4;
    char pad2[8];
    int member7;
    char pad3[12]
}
```

The generated source code that produces this abbreviated CTable declaration does so by computing the size of each required padN character array. It can do so via code of this form:

```
CTable *pTb1 = Null;
int padLen;
int sizeSoFar = 0;
printf("sturct Ctable\n{\n");
padLen = (char *)(pTb1->member4) – (char *) pTb1;
printf("   charpad1[%d];\n", padLen);
printf("   int member4;");
sizeSoFar + = padLen + sizeof(pTb1 ->member4);
padLen = (char *)(pTb1->member7) – (char *) pTb1->member4);
printf("   charpad2[%d];\n", padLen);
```

```
printf("   int member7;");
sizeSoFar + = padLen + sizeof(pTb1 ->member7);
padLen = sizeof (CTable) – sizeSoFar;
printf("   char pad3[%d];\n", padLen;
```

By this means, a minimal structure declaration is generated and compile times are reduced.

In another example, the following demonstrates two forms of generated code for the same query. The first example includes null checks for the joined fields. The second example demonstrates the suppression of the null-checks. The code generation software relies on the table definition in the database schema to determine whether nulls checks are required. If either table is the intermediate result of an earlier part of the query, the code generation software relies on the result set static and/or dynamic statistics to determine whether null-checks are required.

```
/****** Null checks required in table join **********/
DCC_PACKED struct TScan0 {
    TRecordNum rowNum;
    TXid txCreated;
    TXid txDeleted;
    uint16 size;
    uint8 nulls[1];
    uint8 pad1[1];
int f0;
char f1[12];
char f2[12];
} GNUC_PACKED ;
DCC_PACKED struct TTemp5 {
    uint16 size;
    uint8 nulls[1];
    uint8 pad1[1];
int f0;
char f1[12];
vlen_t f2[0];
} GNUC_PACKED ;
...
  for ( Scan0 = (TScan0 *)bufStarts; Scan0 < (TScan0 *)bufEnds;
  Scan0++, curRowAddr++ ) {
    { // Hasher:
      hash4 = *((int32*)(&Scan0->f0));
    }
    // node 05 (THashJoinNode)
    pTst5 = SELECT_HASH_LIST(tTemp5,hash4);
    while ( TRUE ) {
loop_5:
      for ( ; pTst5; pTst5 = pTst5->next ) {
        Temp5 = (TTemp5*)pTst5->recP;
        // PERFORM THE INNER LOOP JOIN COMPARE HERE
        if ( !(Scan0->nulls[0] & 0x1) && !(Temp5->nulls[0] & 0x1) &&
        (Scan0->f0 == Temp5->f0) ) {
          // update pTst5 here because we don't hit loop ender
          pTst5 = pTst5->next;
          goto joinIn5;
        }
      }
      // move onto next stream row
      goto endLoop0_0;
joinIn5:
      // logical record used in subsequents steps of the query
      ...
    }
  }
endLoop0_0:;
}
/****** Null checks not required in table join **********/
DCC_PACKED struct TScan0 {
    TRecordNum rowNum;
    TXid txCreated;
    TXid txDeleted;
```

-continued

```
        uint16 size;
        uint8 nulls[1];
        uint8 pad1[1];
    int f0;
    char f1[12];
    char f2[12];
    } GNUC_PACKED ;
    DCC_PACKED struct TTemp5 {
        uint16 size;
        uint8 nulls[1];
        uint8 pad1[1];
    int f0;
    char f1[12];
    vlen_t f2[0];
    } GNUC_PACKED ;
    ...
    for ( Scan0 = (TScan0 *)bufStarts; Scan0 < (TScan0 *)bufEnds;
    Scan0++, curRowAddr++ ) {
        { // Hasher:
        hash4 = *((int32*)(&Scan0->f0));
        }
        // node 05 (THashJoinNode)
        pTst5 = SELECT_HASH_LIST(tTemp5,hash4);
        while ( TRUE ) {
    loop_5:
        for ( ; pTst5; pTst5 = pTst5->next ) {
            Temp5 = (TTemp5*)pTst5->recP;
            // PERFORM THE INNER LOOP JOIN COMPARE HERE
            if ( Scan0->f0 == Temp5->f0) {
            // update pTst5 here because we don't hit loop ender
            pTst5 = pTst5->next;
            goto joinln5;
            }
        }
        // move onto next stream row
        goto end Loop0_0;
    joinln5:
        // logical record used in subsequents steps of the query
        ...
        }
    }
    endLoop0_0:;
    }
```

Emit Declarations of Src/Target Records

The next 48 phase is to emit structure definitions for tuples in the output streams of each process 20, 22, 24. This is largely accomplished by the procedure called CGenCode::genStreamNodes which is described above. Before calling genStreamNodes, the CGenCode::genSrc procedure initializes the expression generator. After calling genStreamNodes to define the output record formats of each process, CGenCode::genSrc emits expression parameter structure definitions if necessary.

Emit Code 41

The next phase 41 produces the code for procedures which implement each plan process. In general, there is one procedure per process 20, 22, 24 (however ScanNode, RestrictNode and ProjectNode are frequently combined into one procedure, and the ReturnNode processing is generally included with the implementation of the penultimate process 22).

The code implementing each function is produced in four steps. The first step, called CGenCode::emitLoopHdrStuff, emits the function signature, variable declarations and initializations and forward references to statics. Then, CGenCode::emitLoopHdr emits the setup code for looping over each record in the process's input stream. The third step, CGenCode::emitLoopBodyStuff, emits the code for processing the next record in the input stream. The final step, called CGenCode::emitLoopFtr, performs post-processing and cleanup.

These steps are executed in a loop as follows:

```
for (int nextNode=0; nextNode < m_sizeStreamInfo;
nextNode=followingNode)
    m_endLoopNestingLevel = 1;
    followingNode = chooseNextNode( nextNod );
    emitLoopHdrStuff( nextNode, followingNode );   // define function
    emitLoopHdr( nextNode, followingNode );        // emit "for" loop
    emitLoopBodyStuff( nextNode, followingNode );  // emit loop body
    labelPos = m_streamInfo[nextNode]->nodePos;
    while (--m_endLoopNestingLevel >= 0) {
        PutLabl("endLoop%d_%d:;", labelPos,
            m_endLoopNestingLevel);
        EndBlok( );
    }
    PutLabl( "endLoop_%s:", m_streamInfo[nextNode]->recName;
    emitLoopFtr( nextNode, followingNode );        // close braces
                                                   etc.
}   // end for each node
```

Emit the Code to Define Functions for Each Plant Process

In step 43, CGenCode::emitLoopHdrStuff performs the following:
    Emits a comment indicating the start of code
    Calls a function to emit forward references to static helper functions used for sorting and aggregation. For example, a comparison function used by a sorter would be declared in advance of its definition.
    Emits forward references to continuation functions, that implement subsequent processes 22, 24 in the plan 14.
    Emits a the signature of the function, which is always of the form:
        void GenPlan<local><piece#>$_{13}$ <node#>(Cplan* plan, char* bufstarts, char* bufEnds, bool lastCall).
    Emit a statement that initializes an integer bufSize variable=bufEnds-bufStarts
    Potentially emit other variable declarations depending on the process 20, 22, 24 type Emit the Loop Header (Step 45)

CGenCode::emitLoopHdr has the job of producing the "for" loop that iterates over each record in the input stream. There are special cases for ScanNodes for records that have nulls and ScanNodes for records that don't; ScanNodes for records that have variable length fields and those that don't; ScanNodes that read records from disk; scanNodes that read records from the network fabric; and ScanNodes that read records from memory or a temporary file (for the inner loop of a join). There are also special cases for SortNodes and Aggregate Nodes, and MaterializingNodes. The basic pattern for a fixed-length disk-based scan that allows null values is the following:

```
char *recP, nextRecP;    // pointers to current & next record in stream
char* pPrev;
char* pRecordLength = bufEnds – sizeof(unsigned short );
int recordLength = 0;
if ( bufStarts ) recordLength = *(unsigned short*) pRecordLength;
else     bufEnds = bufStarts;
for ( recP = bufStart; recP < bufEnds; recP += sizeof( TScan0 ) ) {
    Scan0 = (TScan0*) recP;
    nullsScan0P = (char*) & (Scan0->nulls);
    if ( plan->m_interruptRequested ) GencAbortPlan( plan );
```

The basic idea of this code fragment is to loop over each record in the input stream, casting it to the structure definition (TScan0) emitted earlier in step 48. This allows the subsequent code in the loop body to access fields of the record efficiently. The test in the last line is for external interruptions and transaction aborts so that the system can prematurely halt execution of a plan each time through the loop.

Emit the Loop Body

This is the routine 47 that emits the main bulk of the code that implements the intent of a plan process or a sequence of processes 20, 22, 24. The routine 47 takes start and end process 20, 24 identifiers as parameters, and loops from the start process 20 up to but not including the end process 24. Each time through the loop, the routine 47 dispatches based on the type of the next process, calling a routine (examples below) to emit the loop body for that specific type of process.

The following example illustrates the generated code for a query that joins two tables and returns a sorted result set. It includes two loops—the first to scan, join and materialize into the pre-sort table. The second to scan the pre-sort table materializing into a return set. While not the case for this example, the return set may include different fields than the preceding sort materialization. The FirstPhase routine will be called repeatedly until all scanned data is processed. The Second-Phase routine is called only once—after the last call to the FirstPhase.

```
DCC_PACKED struct TScan0 {
    TRecordNum rowNum;
    TXid txCreated;
    TXid txDeleted;
    uint16 size;
    uint8 nulls[1];
    uint8 pad1[1];
int f0;
char f1[12];
vlen_t f2[0];
} GNUC_PACKED ;
DCC_PACKED struct TTemp5 {
    uint16 size;
    uint8 nulls[1];
    uint8 pad1[1];
int f0;
} GNUC_PACKED ;
DCC_PACKED struct TSort8 {
    uint16 size;
    uint8 nulls[1];
    uint8 pad1[1];
int f0;
char f1[12];
} GNUC_PACKED ;
DCC_PACKED struct TReturn9 {
    uint16 size;
    uint8 nulls[1];
    uint8 pad1[1];
int f0;
char f1[12];
} GNUC_PACKED ;
void FirstPhase(CPlan *plan, char *bufStarts,char *bufEnds,
bool lastCall) {
    // Join and add records to materialization.
    // Sort when all done
    for ( Scan0 = (TScan0 *)bufStarts; Scan0 < (TScan0 *)bufEnds;
    Scan0=nextScan0, curRowAddr++ ) {
    { // Hasher:
        hash4 = *((int32*)(&Scan0->f0));
    }
    // node 05 (THashJoinNode)
    pTst5 = SELECT_HASH_LIST(tTemp5,hash4);
    while ( TRUE ) {
loop_5:
    for ( ; pTst5; pTst5 = pTst5->next ) {
        Temp5 = (TTemp5*)pTst5->recP;
        if ( !(Scan0->nulls[0] & 0x1) && !(Temp5->nulls[0] & 0x1) &&
         (Scan0->f0 == Temp5->f0) ) {
        // update pTst5 here because we don't hit loop ender
```

```
        pTst5 = pTst5->next;
        goto joinln5;
    }
}
// move onto next stream row
goto endLoop0_0;
joinln5:
    {
    // For SortNode:
    Sort8 = RecordPositionInLastBlock(recStore8);
    tSort8->m_records[tSort8->m_numRecords++] = (record_t*)Sort8;
    // materialize record into *Sort8
    Sort8->size = 20;
    char *Sort8Pos = (char *)Sort8 + 20;
    Sort8->nulls[0] = 0;
    uint16 lenScan0_p0;
    if ( (Temp5->nulls[0] & 0x1) ) {
        Sort8->nulls[0] |= 0x1;
        Sort8->f0 = 0;
    }
    else
        Sort8->f0 = Temp5->f0;
    uint16 lenScan0_p1;
    if ( (Scan0->nulls[0] & 0x2) ) {
        Sort8->nulls[0] |= 0x2;
        BytewiseMemClear(Sort8->f1,sizeof(Sort8->f1));
    }
    else
        BytewiseMemcpy(Sort8->f1,Scan0->f1,sizeof(Scan0->f1));
    Sort8->size = ALIGN_RECORDS((uint8 *)Sort8Pos -
        (uint8*)Sort8 - 0);
    }
endLoop0_1:;
    }
endLoop0_0:;
}
endLoop_Scan0:
// for SortNode
if ( !lastCall )
    return;
node8->m_sortInfo.qsortTable( );
}
void SecondPhase(CPlan *plan, char *bufStarts,char *bufEnds,
bool lastCall) {
    // Loop thru the sorted records, add them (or a subset of the fields)
    // to the return-set materialization.
    rdex ixSort8;
    for ( ixSort8 = 0; true; ixSort8++ ) {
     if ( ixSort8 >= tSort8->m_numRecords )
        break;
    Sort8 = (TSort8*)tSort8->m_records[ixSort8];
    {
    // For ReturnNode:
    // The RecordPositionForReturns( ) call is a caching layer
    // that transmits previously materialized records as needed.
    Return9 = RecordPositionForReturns(recStore9);
    tReturn9->m_numRecords++;
    // materialize record into *Return9
    Return9->size = 20;
    char *Return9Pos = (char *)Return9 + 20;
    Return9->nulls[0] = 0;
    uint16 lenSort8_p0;
    if ( (Sort8->nulls[0] & 0x1) ) {
        Return9->nulls[0] |= 0x1;
        Return9->f0 = 0;
    }
    else
        Return9->f0 = Sort8->f0;
    uint16 lenSort8_p1;
    if ( (Sort8->nulls[0] & 0x2) ) {
        Return9->nulls[0] |= 0x2;
        BytewiseMemClear(Return9->f1,sizeof(Return9->f1));
    }
    else
        BytewiseMemcpy(Return9->f1,Sort8->f1,sizeof(Sort8->f1));
    Return9->size = ALIGN_RECORDS((uint8 *)Return9Pos -
        (uint8*)Return9 - 0);
    }
endLoop9_0:;
```

```
}
endLoop_Return9:
}
```

In the preferred embodiment, if the main code being generated has a function call to a respective function, routine 478 considers "in-lining" the function code (i.e. copying lines of code for implementing the respective function and replacing the function call with those copied lines.) Routine 47 determines whether to in-line the respective function code based on size of affected data (i.e. records referenced in the function call). A user configurable threshold may be used.

Emit Loop Footer Code

At step 49, loop footer code is emitted. The loop footer code performs cleanup and loop wrap up functions. It first emits code to reset the expression pool and to update node statistics. Then it loops through the processes passed in as parameters, and dispatches to the variant of emitLoopFtr code for the specific type of process.

The CGenCode::loopFtrReturnNode checks to see if the routine 49 has been called for the last time, and if so, calls the TReturnNode's returnNewBlock routine (to return the last buffer of results).

Wrapup CGenCode::genSrc

After having written the source code to process the input stream for each process in the plan or piece of the plan, this procedure (step 51) performs the following wrap-up work:
Close the final function definition with a "}"
Emit the definitions for all static helper functions (sort & aggregate comparisons)
Write the headerBuffer to the source file
Write the sourceBuffer to the source file
Close the source file
Release the memory pool Annotating Precision and Scale for Natively-Supported Arithmetic The method used to utilize natively-supported arithmetic is now described.

Expressions are represented by a typical "expression tree." For example, the expression A+(B*C) is represented by a tree of the form:

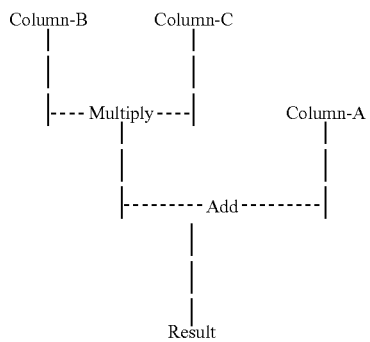

The method for choosing narrow native arithmetic operations for expression evaluation calls for each node of an expression tree to be annotated with precision and scale information. The user of the invention has declared the three columns referenced by the example expression to have particular precisions and scales. Call these the "declared precision and scale." In addition, the system audits the actual values in each table, keeping track of column minimum and maximum values, among other statistics. Thus, each column has a secondary precision and scale, based on the minimum precision needed to hold the actual values existing in the table at the time of query evaluation. Call these the column's "domain precision and scale."

A technique for the evaluation of the result of an expression involves recursively processing each node of the tree. In the example tree above, such an evaluation might proceed as follows: Evaluate the Add node by first evaluating each of its two arguments and then adding them together. To evaluate the first argument to Add, recourse and evaluate the Multiply node. The arguments to the Multiply node are two simple column references, so simply fetch the two column's values and multiply them together. This returns us to the evaluation of the Add node with its first argument value in hand. The second argument to the Add node is a simple column reference, so add the value of that column to the result of the multiplication to produce the result of the addition. This produces the result of the entire expression.

To annotate the expression tree with precision and scale information, a process parallel to the above outlined evaluation of the expression's result is performed. But rather than evaluating each node's value based on its arguments, each node's precision and scale are evaluated based on the precision and scale of the node's arguments. Evaluation of precisions and scales is done using natural rules. For example, the precision and scale of the result of adding arguments having precisions and scales (P1, S1) and (P2, S2) is given by:
Scale: max (S1, S2)
Precision: max (S1, S2)+max (P1-S1, P2-S2)+1

Note that (P1-S1) gives the number of integer places in the first argument. Thus the formulas given above formally represent the "natural" behavior that the addition result can have one more integer digit than has its argument having the larger number of integer places, and the result scale is the larger of the two argument scales.

Similar natural rules can be formalized for the four arithmetic operations. For example, the precision and scale of the result of the multiplication of the example arguments are:
Scale: S1+S2
Precision: P1+P2+1

So, using such precision and scale evaluation rules and a standard recursive expression tree evaluation method, each node of an expression tree can be annotated with both the declared and domain precisions and scales.

Using Expression Tree Precision and Scale Annotations

In the generation of C code to evaluate an expression, each time a numeric argument needs to be manipulated (as in the example expression of the preceding section), the annotated domain precisions are used (at 34, FIG. 3) to determine the size of the object actually manipulated by the C code produced. For example, consider two columns of precision and scale (15,2) that are multiplied together. While each value might be stored on disk as a 64-bit integer, domain precisions might be small enough to permit only the low-order 32 bits of each column value to be picked up and multiplied, thus giving a 64-bit result, narrower than the worst-case 128-bit result. This use of narrow native arithmetic operations provides a significant performance savings over doing worst-case evaluations in software emulation of 128-bit or even 64-bit arithmetic.

Further in the generation of the source code, optimizer 34 may include a review or determination of the range of values stored on disk (i.e., widths of data). According to the determined range of database table values, optimizer 34 adjusts width of variables in the source code being generated.

EXAMPLE

The following SQL Statements create and populate a table:
    create table ps (n numeric(20,2) not null, m numeric(20,4) not null);
    insert into ps values (25.10, 130.3000);

And this statement retrieves a computed value from the table:
    select (n+m)+2*(n+m) from ps;

The two columns, n and m, have declared precisions of 20 decimal digits and are stored by the invention as 128-bit values. So, a C++ code fragment showing the record layout would be:

```
// Input data record structure.
struct TScan 0 {
CNumeric128 f1;    // column n
CNumeric 128 f2;   // column m
};
```

But, by virtue of the invention's tracking of actual column values, one knows that the data in column n requires only 4 decimal digits, and column m only 7 decimal digits. So, this is a good example to show the advantage of the invention.

First, let's look at some C++ code fragments in the absence of this feature of the invention:

```
// Select result row, with wide 128-bit result column f0.
struct TReturn 3 {
CNumeric128 f0;      // wide expression result
};
// Expression evaluation code.
{
    // Wide 128-bit expression result temp.
    CNumeric128 var1;
    // tmp0 holds value of common subexpression (n+m) in the example
    // and tmp0 is 128 bits wide.
    CNumeric128 tmp0;
    // Evaluate the common subexpression (n+m).
    // Note that here we manipulate the full width of each column.
    // Scan0 points to the data's TScan 0 structure.
    tmp) = (((100*(Scan0->f1))+((Scan0->f2))));   // f1 scaled
    for alignment
    // Evaluate the expression result into the wide result temp.
    var1 = tmp0+((0x2*tmp0));
    // Move the result to the output record.
    // Return3 points to the return data's TReturn3 structure
    Return3 ->f0 = var1;
}
```

As one can see, the above code manipulates 128-bit values throughout, even though the actual data values could be manipulated in narrow variables using the processor's native arithmetic operations.

Here is the same expression evaluation in C++ code generated by the invention using the precision and scale annotations as described:

```
//Select result row, with narrow 64-bit result column f0
struck TReturn3{
CNumeric64 f0;     // narrow expression result
};
```

-continued

```
//Expression evaluation code.
{
    // Narrow 64-bit expression result temp
    CNumeric64 var1;
    //tmp0 holds value of common subexpression (n+m) in the example
    // and tmp0 can be narrow, 32 bits wide.
    int32 tmp0;
    // Evaluate the common subexpression (n+m).
    // Note that although columns f1 and f2 are declared wide in the
    // record layout above, we know we can manipulate only the bottom
    // 32 bits of each column.
    tmp0 = (((100*(Scan0->f1.getI32( )))+((Scan0->f2.getI32( )))));
    // Evaluate the expression result into the 64 bit result temp.
    var1 = tmp0+(((int64)0x2*tmp0));  // Native 32-bit arithmetic
    // move the result to the output record
    Return3->f0 = var1;
}
```

In the above C++ fragments, one sees instances of objects of classes CNumeric64 and CNumeric128. These are classes used by the invention to hold 64- and 128-bit integer values. They implement very efficient arithmetic operations via optimal C-language inline assembler code, taking advantage of native machine operations. In addition, they implement methods like the getI32( ) method used above to efficiently extract the low order 32 bits of a wider value.

The examples also show how variables are sized appropriate to the range of values they hold. You can see this in the declarations of var1, tmp0, and member f0 of structure TReturn3, all of which are sized narrow in the example of the optimized generated source code.

Service Routines

There are a number of subroutines that are called by many of the main code emitters, to do specialized checking or to code emitting.

CGenCode::fieldNullAllowed

This procedure returns true if a specified field of a tuple can possibly be null, and returns false if the field cannot be null. The procedure is used in a number of contexts by the Code Generator component 16 to determine whether it is necessary to emit code to check for the presence of NULL values.

The procedure performs a number of checks. If the supplied output stream has a flag indicating that its tuples can have null fields, the procedure returns true. If the field is a computed expression, a check is made to see if the result cannot be null. Finally, the description of the specified field is checked to see if null values have been declaratively precluded.

In one embodiment, statistics are kept on the actual existence of null values for a field of a given table. Even if the field declaratively allows null values, if the statistics show that there are no null values currently, the fieldNullAllowed routine could return false.

CGenCode::emitNullSetStr

This procedure emits the source code necessary to set a field to a null value. The code it generates must be tied to the underlying DBMSs representation of null values. In one embodiment, a DBMS may represent null values as a bit vector which is an extra field of a record called "nulls"; and where the value of the $n^{th}$ bit indicates whether the $n^{th}$ field of the record is null. In such an embodiment, the code emitted by this procedure to set the $5^{th}$ field to null would have the form:

recordPtrVariableName->nulls[0] |=(0×1<<5);

which would set the 5$^{th}$ bit of the null vector of the record to 1. Different representations of null values are possible and this procedure would then generate different code.

In a preferred embodiment, code generator 16 may use "nulls" to overwrite field references in an outer join operation. Null value indicators and the like may be used here.

The following code fragment demonstrates the use of 'useNulls' Flag. The code shown below materializes the results of a left outer join into the return set to be returned to the client.

Note the use of the variable 'useNullsTemp5' below. useNullsTemp5 is false when materializing a matching row. useNullsTemp5 is set to true when materializing a non-matched row from the left table. useNullsTemp5 is needed because during a materialization phase of a left outer join the pointer to record from the right is NULL. With the use of the overriding useNullsTemp5 flag one is able to use the same code structure for inner and outer joins. Note that for inner joins the 'if' statement doesn't even test for useNulls.

```
// node 08 (TReturnNode)
{
    // For ReturnNode:
    TMemblockInfo *block8 = recStore8 ->m_lastBlock;
    VERIFY_FSPACE (Return8, TReturn8, tReturn, block8, 2008,
    node8, returnNewBlock);
    block8->m_numRecords ++;
    tReturn8 ->m_numRecords ++;
    // materialize record into *Return8
    Return8 ->size = 8;
    Char *Return8Pos = (char *) Return8 + 8;
    Return8 ->nulls [0] = 0;
    uint16 lenScan0_p0;
    if ( (useNullsTemp5 || (Temp5->nulls [0] & 0x1)) ) {
        Return8 ->nulls [0] | = 0x1;
        Return8 ->f0 = 0;
    }
    else
        SWAP_INT32 (&Return8->f0, Temp5->f0);
    Return8->size = ALIGN_RECORDS ((Uint8 *)Return8Pos –
(*uint8*)Return8 – 0);
    //lock record in
    UPDATE_WRITE_ADDR(block8, Return8 ->size);
    SWAP_UINT16(&Return8->size, Return8 ->size);
}
```

CGenCode::getNullTestStr

This procedure emits the source code necessary to test whether a field is null. The code generator calls it only if a field could possibly be null. If a field is declared "not null" in a SQL column definition, or if the DBMS can determine that there are no null values for the field, then the code generator does not emit the code to (needlessly) perform the test.

The code that is generated to test whether a field is null must be tied to the underlying DBMSs representation of null values. In one embodiment, a DBMS may represent null values as a bit vector which is an extra field of a record called "nulls"; and where the value of the n$^{th}$ bit indicates whether the n$^{th}$ field of the record is null. In such an embodiment, the code emitted by this procedure to test the 5$^{th}$ field would have the form:

if ((recordPtrVariableName->nulls[0] & (0x1<<5) !=0)

which would determine whether the 5$^{th}$ bit of the null vector of the record was 1. Different representations of null values are possible and this procedure would then generate different code.

CGenCode::loadFields

This procedure emits a declaration of an array of pointers to field values, and initializes their actual values. It is used by the RestrictNode to specify the field values used in a restriction qualification.

The procedure takes a TStreamInfo parameter and a String to be the name of the array of fields. First, it finds the number of fields in the stream, and emits a declaration of the array as follows:

void* ArrayName[numFields];

Next, the procedure loops over the fields in the stream, and retrieves the value of the next field of the current record in the stream. Then it calls the CGenCode::fieldNullAllowed function described above to determine whether the field can possibly hold null values. If not, the procedure emits an assignment of the next field value as follows:

ArrayName[nextFieldIndex]=nextFieldValue;

If the field could possibly be null, this assignment is modified to preserve null values:

ArrayName[nextFieldIndex]=(<field-dependent test for null>) ? NULL: nextFieldValue;

One embodiment of this procedure is shown below.

```
void CGenCode::loadFields (TStreamInfo *flowInfo, char *arrName /*=
"fields"*/)
{
    int numFields = flowInfo->numFields;
    char fieldAt[100], nullStr[100];
    PutStmt("void *%s[%d]",arrName,numFields);
    for ( int ix = 0; ix < numFields; ix++ ) {
        getFieldAt(fieldAt,flowInfo,ix);
        if ( fieldNullAllowed(flowInfo,ix) ) {
            getNullTestStr(nullStr,flowInfo,ix);
            PutStmt("%s[%d] = (%s ? NULL:
            %s)",arrName,ix,nullStr,fieldAt);
        }
        else
            PutStmt("%s[%d] = %s",arrName,ix,fieldAt);
    }
}
```

CGenCode::getFieldStr

This procedure generates names of variables and structure field references for use in generated code. It takes three parameters: a pointer to a string that will contain the resulting name (called fieldStr), a pointer to a TStreamInfo structure (called sP), and an integer index (called dex) of a field in the sP stream.

The procedure first accesses the TStreamField description associated with the dex$^{th}$ field in the sP stream. It then retrieves the name of the variable used to refer to the current record in the stream. If this name is null, then the field referenced by 'dex' is a computed column, and the procedure returns a value of the form "var#" into 'fieldStr', where the number ('#') is specified in the TStreamField (its 'varNum' member).

If the requested field does have a name, the procedure then checks whether the field has a fixed size or if not, whether it is the first variable size field. In either of these cases, the field is at a known offset, and the procedure returns a string of the form:

recordVariableName->fieldName into the 'fieldStr' parameter, where the 'recordVariableName' comes from the TStreamField's 'recName' member, and the 'fieldName' is of the form "f#" (meaning the n$^{th}$ field).

Finally, if the field is not at a known offset, the procedure returns a string of the form:
   GetVarFieldPtr((record_t*) recordVariableName, offset, firstVariableOffset)

into its 'fieldStr' parameter. The function call above, when compiled and executed, will locate a pointer to the field. In one embodiment, it operates by chaining down each of the variable length fields of the record indicated by recordVariableName.

One embodiment of this procedure follows:

```
void CGenCode::getFieldStr(
    char *fieldStr,
    TStreamInfo *sP,
    int dex)
{
    TStreamField *fP = &sP->flds[dex];
    char *nm = fP->recName;
    int srcCol = fP->srcDex;
    if ( !nm ) { // computed column?
        sprintf(fieldStr,"var%d",fP->varNum);
        return;
    }
    int offset = fP->table->m_fields[srcCol].offset;
    // if a fixed length field or the first variable length, just point to it
    if ( fP->isFixedSize || (offset == 0) )
        sprintf(fieldStr,"%s->f%d",nm,fP->srcDex);
    // no, is a var fields (and not the first of them)
    else
        sprintf(fieldStr,"GetVarFieldPtr((record_t*)%s,%d,%d)",
            nm,offset,fP->stream->firstVarOffset);
}
```

CGenCode::emitCopyRecord

This procedure generates code that copies a whole structure from a source location to a destination location. If the structure is fixed size, the generated code uses the compiler support for the copy. If the structure is variable size, it generates code to copy an integer at a time.

The procedure takes four parameters: a destination memory pointer, a source location memory pointer, the name of a type of structure (called typeName), and a CTable pointer (called table) that describes the records being copied. The first step is to test the CTable pointer to see if the records in the table have variable length fields. If there are none, then a line of code is emitted to perform a structure-level copy as follows:
   "*((typeName) destination)=*((typeName) source)"

where the "(typeName)" casts the destination and source pointers to their proper structure name, so that the compiler can generate the most efficient machine code to perform the copy. If there are variable length fields, the procedure emits a function call that performs an integer-by-integer copy:
   "IntwiseMemcpy(destination, source, *((int*) source))"

where the first word of the source pointer is presumed to contain the length (in integers) of the structure to be copied. One embodiment of the procedure follows:

```
void CGenCode::emitCopyRecord (char *dstName, char *srcName,
char *typeName, CTable *table)
{
    if ( !table->m_numVaryingFields )
        PutStmt("*((%s*)%s) = *((%s*)(%s))",typeName,dstName,
            typeName,srcName);
    else
```

```
        PutStmt("IntwiseMemcpy(%s,%s,*((uint16*)(%s)))",dstName,
            srcName,srcName);
}
```

CGenCode::emitCopyField

This procedure generates code that copies a field from a source record into a corresponding field in a destination record. If the field is variable length, it also emits a declaration of a character pointer to track where the next varchar, if any, should go. The procedure also emits code to handle copying null values and to perform byte swapping if necessary.

In the first step, the procedure calls the CGenCode::getFieldStr utility function to get back the strings used to reference the source and destination fields in the generated code. These strings will either be variable names (for computed fields), or of the form "structure->fieldMember" (for references to the columns of a record).

In the next step, the procedure checks whether the fields are fixed length. If so, it next checks whether null values are allowed in either the source field or the destination field. If nulls are not allowed, the procedure then checks whether byte swapping is necessary. If byte swapping is not necessary, then the procedure emits a simple assignment:
   destinationRecordPtr->destinationField=sourceRecordPtr->sourceField where the strings "destinationRecordPtr->destinationField" and "sourceRecordPtr->sourceField" were produced in the first step. Otherwise, byte swapping is necessary, and the procedure calls the procedure CGenCode::emitSwapAndAssign, passing in the TStreamField pointers that describe the source and destination fields, as well as the strings used to reference those fields, as produced by the first step. The emitSwapAdnAssign function emits code that (1) swaps bytes of the source field value if necessary, depending on its datatype; and then (2) assigns the swapped value to the destination field.

If nulls are allowed (CGenField::fieldNullAllowed), the procedure emits code is that (1) checks whether the source field is null (CGenField::getNullTestStr), and if it is, then (2) to set the destination field to be null (CGenField::emitNullSetStr); else if it (the source field) isn't null, then to emit the same code described above for depending on whether byte-swapping necessary or not.

In one embodiment, this processing of fixed length field copying is effected as:

```
if ( fieldNullAllowed(srcP,srcCol) && dstTable->m_nullsAllowed ) {
    PutBlok("if ( %s )",getNullTestStr(nullStr,srcP,srcCol));
    emitNullSetStr(dstP,dstCol);
    PutStmt("%s = 0",dstStr);
    EndBlok( );
    PutQblk("else");
    //BYTE-SWAP
    if (dstP->m_byteSwap)
        emitSwapAndAssign(dstFldP, dstStr, srcFldP, srcStr);
    else
        PutStmt("%s = %s",dstStr,srcStr);
} else    {
    //BYTE-SWAP
    if (dstP->m_byteSwap)
        emitSwapAndAssign(dstFldP, dstStr, srcFldP, srcStr);
    else
        PutStmt("%s = %s",dstStr,srcStr);
}
```

GenCode::materializeRecord

This procedure is used to construct a record in an output stream from fields in an input stream. In one embodiment it takes three parameters: the two streams, and a callback function to be used to extend the amount of space (technically the recordStore) of the output stream.

The first step is to emit a comment announcing that the following code is materializing a particular type of record:

PutComt("materialize record into * % s", outputStream->recName);

Then, a test is performed to determine if the data in the input stream has the same "shape" as the records in the output stream. Records have the same shape if they have the same number of fields of the same type in the same order. If so, the procedure attempts to emit code to do an efficient structure-level copy from input to output, by calling the emitCopyRecord service routine, and passing in the name of the variable used to indicate the location of the end of the output stream, the name of the variable used to indicate the location of the current record in the input stream, the name of the type of the record in the input stream, and a pointer to the CTable describing the input stream records. In this case of same shape records, this materializeRecord procedure is now done, and returns 0.

Next, if nulls are allowed in the destination table in the output stream, then code is emitted to clear all null values in the destination record. In an embodiment where a DBMS represents nulls as bits in a vector, this generated code would set all the bits in this vector to 0.

Next, the procedure emits code to perform a field-by-field copy from the current record of the input stream to the current location in the output stream, calling CGenCode::emitCopyField to accomplish this.

CGenCode::EmitVerifySpace

This procedure's main purpose is to emit a MACRO call to ensure that there is sufficient space to fit a record in a recordStore. If there isn't enough space, the MACRO invokes a callback function to extend the recordStore. This callback extension function may have interesting and useful side effects, such as executing a phase of a sort, or returning a partial set of results back to a client.

The format of the output is:

TMemblockInfo *block=last block of the recordStore of the table of the out streamVERIFY_FSPACE(RecordPtr, TypeOfRecord, table, block, size, node, callback) tTableDescriptor->m_numRecords++;

The first line above locates the last block of the record store associated with the output stream. The next line invokes the verification macro. If there isn't enough room for the RecordPtr within the last block the supplied callback function is invoked to create more room. The last line increments the number of records written to the target table.

The procedure takes a destination stream, and a callback extender function. In one embodiment it also takes a variety of other boolean and integer parameters to handle special cases which are not of interest here.

One embodiment of this procedure is as below:

```
void CGenCode::emitVerifySpace (
    TStreamInfo *sP,   // destination stream info
    char *extendFunc,  // run this when extending recordstore
)
{
    char *nm = sP->recName;
    int nid = sP->nodePos;;
```

-continued

```
CTable *tbl = sP->table;
PutStmt("TMemblockInfo *block = recStore%d->m_lastBlock",nid);
int maxSize = tbl->m_maxRecordSize;
PutStmt("VERIFY_FSPACE(%s,T%s,t%s,block,%d,node%d,%s)",
        nm,nm,nm,maxSize,nid,extendFunc);
PutStmt("t%s->m_numRecords++",nm);
}
```

Restrict

The RestrictNode follows a ScanNode and filters out records from the stream that don't meet a boolean criterion. This is accomplished by generating a test within the loop body that looks like:

if(!ExecRestrict(node1->qual, plan, tScan1, fields)) continue;

The meaning of this code is that if the field values specified in 'fields' parameter, do not satisfy the qualification specified by the first parameter, then filter out the record and continue processing the next record in the input stream.

The code above is emitted by the CGenCode::loopBodyRestrictNode method, which takes and input stream and an output stream as parameters.

In one embodiment, the procedure emits a comment announcing that the following code is "// For RestrictNode", and then emits code that starts a block ("{" in C). Next, a test is performed to see if there are any special considerations in generating the code for the restriction. If not, the procedure emits a declaration of an array of field values and emits initializations of field values for every field in the current record in the input stream (conventionally called 'flowInfo'). Next, the procedure emits the code for the "if" and "continue" statements illustrated above, and finally closes the block ("}" in C). An example implementation follows:

```
loopBodyRestrictNode( TStreamInfo* sP, TStreamInfo* flowInfo )
    char fieldStr[100];
    int nid = sP->nodePos;
    TRestrictNode *pNode = (TRestrictNode*)sP->pNode;
    PutComt("For RestrictNode:");
    PutBlok(" ");
    if (usePGexpressions ||
        !pNode->m_plan->createCcodeForNode((TRestrictNode*)pNode, sP,
        flowInfo, 0, this))
    {
        int nid = sP->nodePos;
        // can't generate c code for filter - pump out call to ExecRestrict
        loadFields(flowInfo);
        PutQblk("if ( !ExecRestrict(node%d->qual, plan, t%s, fields) )", nid,
        flowInfo->recName);
        PutStmt("continue");
    }
    EndBlok( );
```

Return

The ReturnNode materializes the information in its input stream and produces records of a requested shape on its output stream. It is used to return both final and intermediate results from one processing locale to another. In a distributed or massively parallel DBMS, where a query plan is divided up into pieces that are distributed to multiple processors, the ReturnNode is called at the end of a distributed piece of work to send partial results back to a requestor.

The main work performed by the code that implements the ReturnNode is to copy field values from various locations in its input stream into records in its output stream. In one embodiment, its output stream consists of a memory buffer that is iteratively filled with records. When the buffer becomes full, its contents are transmitted back to the processing locale that issued the requested execution plan, possibly across a network. When the computer chip architecture of the requesting locale differs from the chip architecture used to process the ReturnNode, the ReturnNode code performs byte swapping, as part of copying values from its input stream to its output stream.

The main code generation occurs in a procedure called
CGenCode::loopBodyRecordSetNode which takes the name of a node type ("Return" in this case), a pointer to an output stream (TStreamInfo* sP), a pointer to an input stream (TStreamInfo* flowInfo), and the name of a callback function ("returnNewBlock" in this case) which is called to extent the outputStream if necessary. The procedure performs the following code generation:

```
PutBlok(" ");
PutComt("For %sNode:",type);
emitVerifySpace(sP,"returnNewBlock");
materializeRecord(sP,flowInfo, extendFunc);
EndBlok( );
```

This emits a block scope and a comment. Then it calls a procedure (emitVerifySpace, described above) that generates code to check that there is enough space in the outputStream to fit another record; and if not, to call the function named "returnNewBlock". This returnNewBlock function operates by flushing the last block of the output stream's record buffer back to the caller, and then allocating a new last block to replace it. Finally, the procedure generates a call to the CCodeGen::materializeRecord function to copy fields from the source input stream (flowInfo) to the output stream (sP); and closes the block scope.

While the "returnNewBlock" function does most of the work of transmitting the results of the ReturnNode back to the caller, it may leave a partially filled last block in the output stream. To finish up and send this last partial block back to the caller, there is a CGenCode::loopFtrReturnNode which performs the following:

PutStmt("if (lastCall) node % d->returnNewBlock(lastCall)",sP->nodePos);

This emits a source code statement that checks to see if this is the last call to the ReturnNode routine, and if so, to call the "returnNewBlock" procedure one last time to flush any remaining records in the last buffer of the output stream back to the caller.

AggregateNode

Aggregate functions, like the SQL "min", "max" and "sum" functions operate on an input stream and accumulate a resulting value. The arithmetic operators used to accumulate this resulting value depend on the datatype of the field in the input stream. Simply put, floating point addition and comparisons are different than integer addition and comparisons. In a DBMS whose runtime execution engine is interpretive, there must be runtime checks to determine which kind of data type and which kinds of arithmetic operator to use. In contrast, the invention determines the datatype of the fields being aggregated at code generation time 16, and generates precisely the right kind of variable declarations and arithmetic operators to perform the calculations. In essence the time required to check the data type of the field is moved from "for every record during runtime" to "once at code generation time". The header, body and footer methods below are one embodiment of this technique.

```
TAggregateNode *pNode = (TAggregateNode *)sP->pNode;

char *nm = sP->recName;

int nid = sP->nodePos;

char recSize[100];

pNode->m_gencHelperStream = cloneWithNewRecName(sP, "curRec");

DEBUGCMT( " ***** loopAggregateNode *****" );

//////////////////////////////////////////////////////////
// // For AggregateNode:
// TAggregateNode *node4 = (TAggregateNode*)plan->m_nodeArray[4];
// CTable *tAggr4 = node4->m_result;
// TAggr4 *Aggr4 = BADPTR(TAggr4*);
//////////////////////////////////////////////////////////
PutComt("For AggregateNode:");
PutStmt("CTable *t%s = node%d->m_result",nm,nid);
// Set Aggr* to 1 in hopes of trapping if used before set. (Was getting compiler warning.)
PutStmt("T%s *%s = BADPTR(T%s*)",nm,nm,nm);

if ( pNode->m_numGroups != 0 ) {
    //////////////////////////////////////////////////////////
    // // Aggr grouping hash table info
    // THashInfo *pTst4;
    // THashInfo *groupHashRec4;
    // TMemblockInfo *groupHashBlock4 = tAggr4->m_hashStore->m_lastBlock;
    // if ( tAggr4->m_hashStore )
    //     groupHashBlock4 = tAggr4->m_hashStore->m_lastBlock;
    // CRecordStore *recStore4 = tAggr4->m_recStore;
    //////////////////////////////////////////////////////////
    // grouping, emit hash table handling data
```

```
PutComt("Aggr grouping hash table info");
PutStmt("THashInfo *pTst%d",nid);
if ( pNode->HasGrpRecId())
    PutStmt("TGroupHashInfo *groupHashRec%d",nid);
else
    PutStmt("THashInfo *groupHashRec%d",nid);
PutStmt("TMemblockInfo *block%d = t%s->m_recStore->m_lastBlock",nid,nm);
PutStmt("TMemblockInfo *groupHashBlock%d",nid);
PutQblk("if ( t%s->m_hashStore )",nm);
PutStmt("groupHashBlock%d = t%s->m_hashStore->m_lastBlock",nid,nm);
PutStmt("CRecordStore *recStore%d = t%s->m_recStore",nid,nm);
char funcStr[300];
PutBlok("if ( !node%d->m_bInitialized )", nid);
PutStmt("node%d->InitializeSorters()", nid);
PutStmt("node%d->m_sortInfo.setCmpRecFnForSort(%s,t%s)",
    nid, getCompareFuncStr(funcStr, nid), nm);
if (pNode->m_flags & NfReclaim)
    initAggrVals(sP, flowInfo);
EndBlok();
char *helperNm = pNode->m_gencHelperStream->recName;
PutStmt("T%s *%s = (T%s*)node%d->m_curRec",nm,helperNm,nm,nid);
// following "tcurRecAggrN" def needed for potential assignment to dest curRec below
PutStmt("CTable *t%s = t%s",helperNm,nm);
}
else { // single record, find it here
    ////////////////////////////////////////////////////////
    // // Aggr record created during node init
    // Aggr3 = (TAggr3*)tAggr3->m_recStore->m_lastBlock->bytes;
    ////////////////////////////////////////////////////////
    PutComt("Aggr record created during node init");
```

```
PutStmt("%s = (T%s*)t%s->m_recStore->m_lastBlock->bytes",nm,nm,nm);
PutBlok("if ( !node%d->m_bInitialized )", nid);
PutStmt("node%d->InitializeSorters()", nid);
if (pNode->m_flags & NfReclaim)
    initAggrVals(sP, flowInfo);
EndBlok();
}

TAggrField *aggrP;
TStreamInfo *aggrsP;
int fdex;

for ( int aggrDex = 0; aggrDex < pNode->m_numAggrs; aggrDex++ ) {
    aggrP = &pNode->m_aggrs[aggrDex];
    if ( aggrP->limitDistinct ) {
        PutStmt("int hitLimit%d_%d = -1",nid,aggrDex);
        PutStmt("int recNum%d_%d = 0",nid,aggrDex);
    }
    if (aggrP->distinct)   {
        aggrsP = sP->aggrs[aggrDex];

PutStmt("TAggrField *aggr%d_%d = &node%d->m_aggrs[%d]",
                        nid, aggrDex, nid, aggrDex);
        PutStmt("CTable *tDistinctAggr%d_%d = aggr%d_%d->table",
                        nid, aggrDex, nid, aggrDex);
        PutStmt("THashInfo* pTst%d_%d", nid, aggrDex);
        PutStmt("T%s *%s", aggrsP->recName, aggrsP->recName);
        PutStmt("uint32 distinctHash%d_%d",nid, aggrDex);
```

```
// !FIX-jpb don't need this at each aggr loop hdr. just first?
    PutBlok("if ( !node%d->m_aggrs[%d].m_sortInfo.m_cmpRecFn )", nid, aggrDex);
    PutStmt("node%d->m_aggrs[%d].m_sortInfo.setCmpRecFnForSort(GenPlan_RecCmp%d_%d_w,t%s)", nid, aggrDex, nid, aggrDex, nm);

PutStmt("node%d->m_aggrs[%d].setCmpRecFnForNarrowCmp(GenPlan_RecCmp%d_%d_n,t%s)", nid, aggrDex, nid, aggrDex, nm);

PutStmt("node%d->m_aggrs[%d].setWidenRecFn(GenPlan_DistincterWidener%d_%d)", nid, aggrDex, nid, aggrDex);
    EndBlok();
  }

}

// Emit the variables & setup used for express stats generation
if ( pNode->m_forExpressStats )
    loopHdrExpressStats(sP,flowInfo);

loopBodyAggNode( .. )
  TAggregateNode *pNode = (TAggregateNode *)sP->pNode;
  int nid = sP->nodePos;

.

DEBUGCMT( " ***** loopBodyAggregateNode *****" );

if ( (flowInfo->flowType != FlowRecord) && (flowInfo->flowType != FlowProjected) )
      THROW_ERROR(NZ_ERROR_IMPL,NULL,flowInfo->flowType);
```

```
PutComt("For AggregateNode");

// Emit the per-loop setup used for express stats generation
if ( pNode->m_forExpressStats )
   loopBodyExpressStats(sP,flowInfo);

if ( pNode->m_numGroups == 0 ) // no grouping?
   loadAggrVals(sP,flowInfo, false);
else if ( isMergedAggregation(pNode,nid) )
   emitAggregateMergeEngine(sP,flowInfo);
else
   emitAggregateHashedEngine(sP,flowInfo);

loopFtAggNode
   TAggregateNode *pNode = (TAggregateNode *)sP->pNode;
   int nid = sP->nodePos;
   char *nm = sP->recName;

if ( isMergedAggregation((TAggregateNode *)pNode,nid) )
      return; // no loop footer for merging!

////////////////////////////////////////////////////////////
// //for aggregate node
// if ( !lastCall )
//    return;
// LogMaterializeNode(plan,node3,lastCall);
//
// node3->lastAggregateNewBlock();
////////////////////////////////////////////////////////////
```

```
PutComt("For AggregateNode");

// For ZONE MAPS
if (NZCFG->system->getInt("zoneMapTableSizeThreshold") > 0) {
   TProjectNode *prev = (TProjectNode *)pNode->m_prev;
   if ( pNode->m_plan->i_forGenStats() && !m_forHost &&
      !isFabricScan( getScanNode() ) ) {
      int fdex, colDex;
      bool lockIn, lastColumn;

PutComt("Add the block-based min-max values to the zone map");

// Since we do not get the block header in the gen'd code, we keep a
      // counter of our own. This works only because the vacuumAnalyze scans
      // the whole table from block0, and the generated code is called for
      // every block read (even empties).  Very sleazy!
      // !FIX-bk Better way to get block number
      PutQblk("if ( !lastCall )");
      PutStmt("node%d->m_numBlocks++",nid);

int numFields;
      TScanNode* pScanNode = getScanNode();
      if (Nz->realFpga && !isRawScan( pScanNode ) )
         numFields = flowInfo->table->i_numFields();
      else
         numFields = prev->numFields;
      for (fdex = 0; fdex < numFields; fdex++) {
         // If the FPGA is not involved, then the flow is a full width table scan.
         // Otherwise, find the true base table column id from the projection list.
         colDex = prev->fieldsList[fdex];
```

```
        lockIn = isColumnForZoneMap(flowInfo,fdex,pScanNode->tblId,colDex,&lastColumn);
        if (lockIn) {
          if (lastColumn)

PutStmt("ExecLockInBlockRange(node%d,%d,%d,blkMax%d,blkMin%d,TRUE,lastCall)",
              nid,pScanNode->tblId,colDex,fdex,fdex);
          else PutStmt("ExecLockInBlockRange(node%d,%d,%d,blkMax%d,blkMin%d,FALSE,lastCall)",
              nid,pScanNode->tblId,colDex,fdex,fdex);
        }
      }
    }
  }

// Emit the variable-saves & count extractor for express stats generation
if ( pNode->m_forExpressStats )
   loopFtrExpressStats(sP,flowInfo);

PutQblk("if ( !lastCall )");
PutStmt("return");
PutStmt("LogMaterializeNode(plan,node%d,lastCall)",nid);

if ( pNode->HasDistinctAggrs() ) {
   int ix;
   TAggrField *aggrP;
   PutComt("do distincters first and then grouping aggregate");
   for ( ix = 0; ix < pNode->m_numAggrs; ix++ ) {
      aggrP = &pNode->m_aggrs[ix];
```

```
if (aggrP->distinct) {
  TStreamInfo *aggrsP = sP->aggrs[ix];
  TStreamInfo *aggrWidesP = sP->aggrsWide[ix];
  TStreamInfo *aggrFinalsP = sP->aggrsFinal[ix];
  TStreamInfo *helperVar = aggrP->m_gencHelperStream;
  char *helperNm = helperVar->recName;
  char buf[200];
  char *nm = aggrFinalsP->recName;
  bool bWiden = pNode->m_numGroups != 0;

PutBlok("");
  PutComt("final distincting for aggr%d_%d",nid,ix);
  PutStmt("TAggrField *aggr%d_%d = &node%d->m_aggrs[%d]",nid,ix,nid,ix);
  PutStmt("T%s *%s", aggrFinalsP->recName, aggrFinalsP->recName);
  PutStmt("T%s *%s", aggrWidesP->recName, aggrWidesP->recName);
  PutStmt("T%s *%s", aggrsP->recName, aggrsP->recName);
  PutStmt("CTable *tFinalDistinctAggr%d_%d = aggr%d_%d->finalTable",nid,ix,nid,ix);
  PutStmt("CTable *tWideDistinctAggr%d_%d = aggr%d_%d->wideTable",nid,ix,nid,ix);
  PutStmt("CTable *tDistinctAggr%d_%d = aggr%d_%d->table",nid,ix,nid,ix);
  PutStmt("T%s *%s = NULL",aggrWidesP->recName,helperNm);
  PutStmt("rdex ix%d_%d",nid,ix);
  PutQblk("if ( aggr%d_%d->m_sortInfo.m_diskBased )",nid,ix);
  PutStmt("aggr%d_%d->distincterNewBlock(true)",nid,ix);

PutBlok("for ( ix%d_%d = 0; true; ix%d_%d++ )",nid,ix,nid,ix);
  PutStmt("TMemblockInfo *block = t%s->m_recStore->m_lastBlock",nm);
  PutBlok("if ( aggr%d_%d->m_sortInfo.m_diskBased )",nid,ix);
  if ( pNode->m_detailStats )
      PutStmt("aggr%d_%d->m_sortInfo.m_sortTime.Start()",nid,ix);
```

```
PutStmt("%s = (T%s*)aggr%d_%d->m_sortInfo.mergeStep((record_t**)&%s)",
    aggrWidesP->recName,aggrWidesP->recName,nid,ix,helperNm);
if ( collectNodeStats(pNode) )
    PutStmt("aggr%d_%d->m_sortInfo.m_sortTime.Finish()",nid,ix);
PutQblk("if ( !%s )",aggrWidesP->recName);
PutStmt("break");
// emit the distincter compare
PutQblk("if ( !%s )",helperNm);
PutStmt("goto NewUnique%d_%d",nid,ix);
for (int jx=0; jx <= pNode->m_numGroups; jx++) {
    char compareStr[1000];
    getCompareStr(compareStr,helperVar,jx,aggrWidesP,jx,true);
    PutQblk("if ( !(%s) )",compareStr);
    PutStmt("goto NewUnique%d_%d",nid,ix);
}
// Use record N in next iteration (N+1) "same?" test
// mergeStep() is much happier that way.
PutStmt("%s = %s",helperNm,aggrWidesP->recName);
PutStmt("continue");
PutLabl("NewUnique%d_%d:",nid,ix);
PutComt("new unique value");
PutStmt("%s = %s",helperNm,aggrWidesP->recName);
if ( bWiden ) {
    getRecSizeBuf(buf,aggrWidesP);
    PutStmt("VERIFY_SPACE(%s,T%s,t%s,block,%s)",nm,nm,nm,buf);
    // !FIX-jpb need to set m_record[n] ??
    sprintf(buf,"T%s",aggrWidesP->recName);
    emitCopyRecord(nm,helperNm,buf,aggrWidesP->table);
}
EndBlok();
```

```
PutBlok("else");
PutQblk("if ( ix%d_%d >= t%s->m_numRecords )",nid,ix,aggrsP->recName);
PutStmt("break");
if ( !bWiden ) {
    PutStmt("%s = (T%s*)t%s->m_records[ix%d_%d]",helperNm,aggrWidesP->recName,
            aggrsP->recName,nid,ix);
} else {
    PutStmt("VERIFY_SPACE(%s,T%s,t%s,block,t%s->m_maxRecordSize)",nm,nm,nm,
            aggrFinalsP->recName);
    getWidenerFuncStr(buf, nid, ix);
    PutStmt("%s(t%s->m_records[ix%d_%d], (record_t *)%s, t%s)",
            buf,aggrsP->recName,nid,ix,aggrFinalsP->recName, sP->recName);
}
EndBlok();
if ( !bWiden ) {
    /* hack - we have no Txxx struct for the helper stream
       so, if fixed size rec, we use wide table struct for sizeof
       otherwise, use helper as source of instant size
    */
    if ( helperVar->table->m_sizeWord )
        getRecSizeBuf(buf,helperVar);
    else
        getRecSizeBuf(buf,aggrWidesP);

PutStmt("VERIFY_SPACE(%s,T%s,t%s,block,%s)",nm,nm,nm,buf);
    // !FIX-jpb need to set m_record[n] ??
    sprintf(buf,"T%s",aggrWidesP->recName);
    emitCopyRecord(nm,helperNm,buf,aggrWidesP->table);
```

```
        }
       PutStmt("t%s->m_numRecords++",nm);
       PutComt("lock record in");
       getRecSizeBuf(buf,aggrFinalsP);
       PutStmt("UPDATE_WRITE_ADDR(block,%s)",buf);
       EndBlok();
       EndBlok();
     }
   }
} if ( pNode->m_numGroups != 0 ) { // grouping?
   PutStmt("node%d->lastAggregateNewBlock()",nid);
} emitCallChain(sP);
```

While this invention has been particularly shown and described with references to preferred embodiments thereof, it will be understood by those skilled in the art that various changes in form and details may be made therein without departing from the scope of the invention encompassed by the appended claims.

For example the DBMS 10 illustrated in FIG. 1 is typically provided at a host server in a client-server architecture. The server may be formed of one or multiple digital processors. Data processing may be in parallel processes or use distributed or other processing techniques. Data storage may be redundant or otherwise.

One example of suitable computer system is disclosed in U.S. patent application Ser. No. 10/667,127 filed Sep. 18, 2003 herein incorporated by reference. Other computer system architectures and configurations are suitable.

What is claimed is:

1. A method for generating machine executable code for implementing a query of a database, the database having tables and records of data, comprising the steps of:
   receiving a subject query;
   forming an execution plan corresponding to the subject query, the execution plan having a sequence of pieces and corresponding processes for implementing the pieces; and
   for at least one piece of the plan, (a) generating source code using different code generation techniques as a function of an expected processing machine type; and (b) compiling the generated source code to form machine executable code for implementing the subject query dependent upon execution results of code generated for a prior piece, said generated source code thereby avoiding runtime interpretation of the pieces in the execution plan,
   wherein the code generated for at least one piece of the plan is cached so that the generated code remains available for use in processing a subsequent plan piece without rerunning the generating step including generating source code using the different code generation techniques as the function of the expected processing machine type, and
   wherein the target processing machines have different numbers of general purpose registers (GPRs), and the compiling step tracks register usage differently for the different target processing machines.

2. A method as in claim 1 additionally comprising:
   delivering the compiled machine executable code to a selected one of the processing machine types for execution.

3. A method as in claim 2 wherein the delivered machine executable code is run on the identified processing machine types to complete the query.

4. A method as in claim 1 wherein the expected processing machine type is two or more machine types to provide a heterogeneous code execution environment.

5. A method as in claim 1 additionally comprising generating linkage information for the generated machine code.

6. A method as in claim 1 wherein the generated machine code is in a C language.

7. A method as in claim 1 wherein there are multiple expected processing machine types for executing at least one piece of the database query, and the generated machine code runs on the multiple machine types in parallel.

8. A method as in claim 1 wherein the code generation step is performed for the subsequent piece but the code is not re-compiled.

9. A method as in claim 1 wherein the query language specifies arithmetic operations at a query language precision level, but wherein the generating step generates only instructions that are carried out using native data types of the target processing machine types.

10. A method as in claim 1 wherein the query language specifies arithmetic operations at a query language precision level, but wherein the generating step generates instructions carried out at a precision level determined from statistics of data stored in the database.

11. A method as in claim 1 wherein the generated source code includes human readable code containing comments for later analysis.

12. A method as in claim 1 wherein the generated code includes human readable source code having variable names that follow a predefined convention.

13. A method as in claim 1 wherein generating source code additionally comprising:
   reading variables for determining a targeted compiler to use;
   creating files for holding the generated source code;
   creating and initializing a structure of an object; and
   calling a function of the structure for generating the source code.

14. A method as in claim 13 wherein reading variable includes reading variables from an environment.

15. A method as in claim 13 wherein reading variable includes reading variables from a configuration file.

16. A method as in claim 13 wherein creating files includes creating file names corresponding to an identifier, an indication of a target locale of an execution, and another identifier for the pieces of the plan being implemented.

17. A method for generating machine executable code for implementing a query of a database, the database having tables and records of data, comprising the steps of:
   receiving a subject query;
   forming an execution plan corresponding to the subject query, the execution plan having a sequence of pieces and corresponding processes for implementing the pieces; and
   for at least several identified pieces of the plan, (a) generating source code for the several identified pieces of the plan, with the source code generated for at least one identified subsequent piece of the plan being dependent upon the results of code generated for another identified prior piece of the plan to be executed prior to the identified piece of the plan; and (b) compiling the generated source code to form machine executable code for implementing the subject query dependent prior execution results of the code generated for the another identified prior piece, said generated source code avoiding runtime interpretation of the at least several pieces in the execution plan, and
   wherein the code for the subsequent piece of the plan is not generated until a run time for the piece occurs, and
   wherein the generated source code is cached so that the generated source code remains available for use in processing the subsequent piece of the plan.

18. A method as in claim 17 wherein the code for the subsequent piece of the plan is not generated until after execution of the prior piece of the plan.

19. A method as in claim 17 wherein the code for the subsequent piece of the plan is not generated until a prior piece of the plan is executing.

20. A system for processing a query on a database comprising:

at least one computer having a memory;

a plurality of database operation processor components, with at least two of the database operation processor components having different operation processing capabilities, such that the database operation processor components provide at least two different locales for executing database operations, the at least two locales of a join operator that references a current record in a stream with the two locales having different operation processing capabilities and such that more than one database operation processor component locale is executing a given selected database operation;

a database catalog comprising database table information, database operation processor component locale information, and database operation processor characteristic information;

a query optimizer receiving the query and accessing the database catalog to develop a query execution plan, the query execution plan defining at least two plan pieces that include database operations to carry out the query, and the query execution plan also defining a respective database operation processor component locale at which to carry out each such database operation in the query execution plan, by comparing the processing capabilities of the different locale types for the database operation; and for at least one piece of the query execution plan, (a) generating source code using different code generation techniques as a function of specified locale types; and (b) compiling the generated source code to form machine executable code for implementing the query execution plan, said generated source code avoiding runtime interpretation of the query execution plan pieces.

* * * * *